US011109107B2

(12) United States Patent
Kiyooka

(10) Patent No.: US 11,109,107 B2
(45) Date of Patent: *Aug. 31, 2021

(54) VIDEO STREAMING PLAYBACK SYSTEM AND METHOD

(71) Applicant: Tetsuro Kiyooka, Vancouver (CA)

(72) Inventor: Tetsuro Kiyooka, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/971,666

(22) PCT Filed: Dec. 10, 2019

(86) PCT No.: PCT/JP2019/048260
§ 371 (c)(1),
(2) Date: Aug. 20, 2020

(65) Prior Publication Data
US 2021/0176532 A1    Jun. 10, 2021

(51) Int. Cl.
*G06Q 20/00* (2012.01)
*H04N 21/4784* (2011.01)
(Continued)

(52) U.S. Cl.
CPC ....... *H04N 21/4784* (2013.01); *G06Q 20/085* (2013.01); *G06Q 20/1235* (2013.01);
(Continued)

(58) Field of Classification Search
CPC ......... H04N 21/4784; H04N 21/47217; H04N 21/4532; H04N 21/2743; H04N 21/812;
(Continued)

(56) References Cited

U.S. PATENT DOCUMENTS 7,020,637 B2    3/2006  Bratton
7,366,687 B2 *  4/2008  Yoshimine ............. G06Q 20/04
                                                          705/27.1
(Continued)

FOREIGN PATENT DOCUMENTS

CN      101433081 A     5/2009
CN      101593385 A     12/2009
(Continued)

OTHER PUBLICATIONS

* European Audiovisual Observatory (Council of Europe). Online video sharing: Offerings, audiences, economic aspects. (2018). Retrieved online Apr. 5, 2021. https://rm.coe.int/online-video-sharing/16808b2e16 (Year: 2018).*

(Continued)

*Primary Examiner* — James A Reagan
(74) *Attorney, Agent, or Firm* — Panitch Schwarze Belisario & Nadel LLP

(57) ABSTRACT

A system provides free streaming video playback which enables video hosting website operators and content providers to obtain revenue. The system includes a tipping module that operates in accordance with this streaming playback operation without obstructing the abovementioned free streaming video playback. When a user who is the content provider has activated a setting in a settings interface whereby a specific number of two or more rewards is offered in response to a tip, the tip processing module verifies whether an amount set by the user who is the content consumer, or a default amount, is equal to or greater than a minimum tip amount set by the user who is the content provider when processing payment of the tip, and otherwise processes payment of the tip according to the amount entered by the user who is the content consumer, or the default amount, without verifying the minimum tip amount.

10 Claims, 28 Drawing Sheets

(51) Int. Cl.

| | | |
|---|---|---|
| *H04N 21/2743* | (2011.01) | |
| *H04N 21/81* | (2011.01) | |
| *H04N 21/45* | (2011.01) | |
| *G06Q 30/02* | (2012.01) | |
| *G06Q 20/12* | (2012.01) | |
| *G06Q 20/08* | (2012.01) | |
| *H04N 21/472* | (2011.01) | |
| *G06Q 40/02* | (2012.01) | |
| *G06Q 50/00* | (2012.01) | |
| *G06Q 50/18* | (2012.01) | |
| *G06Q 30/00* | (2012.01) | |
| *G06Q 40/00* | (2012.01) | |

(52) U.S. Cl.
CPC ..... *G06Q 30/0222* (2013.01); *G06Q 30/0223* (2013.01); *G06Q 30/0277* (2013.01); *H04N 21/2743* (2013.01); *H04N 21/4532* (2013.01); *H04N 21/47217* (2013.01); *H04N 21/812* (2013.01); *G06Q 30/0185* (2013.01); *G06Q 30/0236* (2013.01); *G06Q 40/02* (2013.01); *G06Q 40/12* (2013.12); *G06Q 50/01* (2013.01); *G06Q 50/184* (2013.01)

(58) Field of Classification Search
CPC ............. G06Q 30/0277; G06Q 20/085; G06Q 30/0223; G06Q 30/0222; G06Q 20/1235; G06Q 40/02; G06Q 50/184; G06Q 50/01; G06Q 40/12; G06Q 30/0185; G06Q 30/0236

See application file for complete search history.

(56) References Cited

U.S. PATENT DOCUMENTS

| | | | |
|---|---|---|---|
| 7,508,452 B2 | 3/2009 | Mori et al. | |
| 9,349,108 B2* | 5/2016 | Skeen | H04N 21/252 |
| 10,951,952 B2* | 3/2021 | Kiyooka | H04N 21/8545 |
| 2002/0138827 A1* | 9/2002 | Yoshimine | G06Q 30/06 725/1 |
| 2003/0056214 A1 | 3/2003 | Yuasa et al. | |
| 2003/0149618 A1 | 8/2003 | Sender et al. | |
| 2007/0061302 A1 | 3/2007 | Ramer et al. | |
| 2007/0156594 A1* | 7/2007 | McGucken | H04N 21/8355 705/51 |
| 2007/0266399 A1 | 11/2007 | Sidi | |
| 2009/0271283 A1 | 10/2009 | Fosnacht et al. | |
| 2010/0010921 A1* | 1/2010 | Liu | G06Q 40/12 705/30 |
| 2011/0191246 A1 | 8/2011 | Brandstetter et al. | |
| 2012/0254925 A1 | 10/2012 | Nassiri | |
| 2013/0111602 A1 | 5/2013 | Sidi et al. | |
| 2013/0253993 A1* | 9/2013 | Brower | G06Q 20/123 705/12 |
| 2015/0120767 A1* | 4/2015 | Skeen | G06F 16/639 707/754 |
| 2016/0063581 A1* | 3/2016 | Traina | G06Q 30/06 705/26.1 |
| 2016/0350795 A1* | 12/2016 | Brown | G06Q 30/0239 |
| 2020/0351560 A1* | 11/2020 | Kiyooka | H04N 21/2743 |

FOREIGN PATENT DOCUMENTS

| | | | | |
|---|---|---|---|---|
| CN | 102893298 A | 1/2013 | | |
| EP | 3672266 A2 | 6/2020 | | |
| JP | 2001344530 A | 12/2001 | | |
| JP | 2002101399 A | 4/2002 | | |
| JP | 2012120098 A | 6/2012 | | |
| JP | 6157711 B1 | 7/2017 | | |
| JP | 6574919 B1 | 9/2019 | | |
| WO | WO-2004044770 A1 * | 5/2004 | ......... | G06Q 20/1235 |
| WO | WO-2010008904 A2 * | 1/2010 | ............ | H04H 20/82 |
| WO | 2017217521 A1 | 12/2017 | | |
| WO | 2019082409 A1 | 5/2019 | | |
| WO | 2019083018 A2 | 5/2019 | | |

OTHER PUBLICATIONS

Yasheng Chen. The Business Model of Live Streaming Entertainment Services in China and Associated Challenges for Key Stakeholders. (Aug. 2019). Retrieved online Apr. 5, 2021. https://www.researchgate.net/publication/335152116_The_Business_Model_of_Live_Streaming_Entertainment_Services_in_China_a (Year: 2019).*

Fumitada Takahashi, "Cheap HD video machines develop a new form of broadcasting," Nikkei Electronics, Nov. 12, 2012, No. 1095, pp. 69-75, with partial English translation.

Cranz Inc., "800 Specially Selected Apps for the Latest iPad," p. 56 (Feb. 2013).

Extended European Search Report dated Jul. 23, 2020 in EP Application No. 18869663.7.

Guide to Buying on Bandcamp, Apr. 2016, downloaded from webpage: https://web.archive.org/web/20160420115219/ http://somethingwecando.org/jp/guide.html, Download date: May 16, 2018, 8 pages.

Hayakawa, "The New Standard! iPhone App Guide, 2014 Edition," Ed. 1, p. 227 (May 2014).

Internet Archive: Wayback Machine, downloaded from web page: URL:https://archive.org/web/web.php, Download date: May 16, 2018, 1 page.

Int'l Search Report and Written Opinion dated Apr. 16, 2018 in Int'l Application No. PCT/JP2018/039899, translation of Search report only.

Int'l Search Report dated Jun. 5, 2018 in Int'l Application No. PCT/JP2018/011619.

Introducing YouTube Red Original Series, Movies from your favorite stars, YouTube Official 8109, Oct. 2015, downloaded from web page: URL:https://youtube.googleblog.com/2015/10/red-originals.html, Download date: May 16, 2018, 7 pages.

Kimura et al, "User evaluations on the video recommender system using field experiment," IEICE Technical Report, vol. 112, No. 35, pp. 79-83 (May 2012).

Office Action dated Jul. 2, 2020 in CA Application No. 3080637.

Wayback Machine, downloaded from web page: https://web.archive.org/web/20160515000000/http://somethingwecando.org/jp/guide.html, Download date: May 16, 2018, 4 pages.

Office Action dated Jun. 29, 2021 from Chinese Patent Office for Chinese counterpart Application No. 201880069951.0 of U.S. Appl. No. 16/643,310 with English language translation of opinion portion of Office Action on pp. 3-4, 11 pages total.

* cited by examiner

| | | 900 |
|---|---|---|
| Accept tipping for this video | ● Yes ○ No | ← 902 |
| Show tipping count on this video | ● Yes ○ No | ← 903 |
| Allow downloading of this video as a reward for tipping | ○ Yes ● No | ← 904 |
| Allow downloading of the audio of this video as a reward for tipping | ○ Yes ● No | ← 905 |
| Receive advertising revenue | ○ Yes ● No | ← 906 |

| | | |
|---|---|---|
| Extra reward for tipping | ○ Yes ● No | ← 907 |
| Reward type [        908        ] | | |

| | | |
|---|---|---|
| Set a minimum tipping amount for the above rewards | ○ Yes ● No | ← 916 |

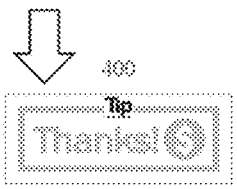  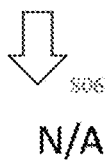  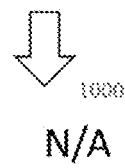

VIDEO STREAMING PLAYBACK SYSTEM AND METHOD

CROSS-REFERENCE TO RELATED APPLICATION

This application is a Section 371 of International Application No. PCT/JP2019/048260, filed Dec. 10, 2019, which has not yet published, the disclosure of which is incorporated herein by reference in its entirety.

FIELD OF THE INVENTION

The present invention pertains to a video streaming playback system for providing video hosting service, and to a method for the same.

BACKGROUND OF THE INVENTION

1. Types of Video Hosting Websites

Recently, there are numerous services for video hosting websites; because of their convenience, these services have been attracting increasing numbers of users from year to year, and are recognized by society at large.

Video hosting website services can be broadly divided into two types.

One type is video hosting sites of the ad-supported model, in which users can watch videos for free in return for viewing ads (videos/images/audio/text); examples of these services include YouTube (registered trademark), Facebook video, and niconico douga (all registered trademarks). The other type is the subscription-based model, in which users pay a fee to watch videos; examples of these services include NETFLIX, Hulu, and Amazon Prime Video (all registered trademarks).

2. Drawback of the Ad-Supported Model

The first type, the ad-supported model, has the drawback that, while users can view videos for free, many users are annoyed by the ads on the video sites.

That is, ads on video sites are primarily online targeted advertising, wherein a user's video watching history and the user's residence (geographical location; determined from the IP address of the site connection), age, sex, etc., are determined, and, based on this information, the site operator shows ads to the targeted users requested by the advertiser. This arrangement allows for highly cost-effective advertising.

However, this also means that the disclosure and collection of private information is the price users pay to view videos for free. Moreover, no matter how advanced online targeted ad technology may become, users simply want to watch videos, and it is natural for users to be annoyed by their videos being interrupted by ads.

In addition, the ad-supported model presents the problem of forbidding the downloading and saving of all videos, including videos for which copyright ownership has been made explicit, on user terminals. The reason for this is that downloading and saving videos to personal terminal allows users to view videos offline, which means circumventing highly cost-effective online targeted advertising and making it difficult to obtain ad revenue.

In fact, YouTube has rolled out another video service (YouTube Premium®) that is ad-free and enables downloading and saving of videos for a fee (monthly), which is more proof that pay-to-view services must take the place of ad revenue in order to provide ad-free service that offers video downloading and saving.

3. Drawbacks of Pay-to-View Models

In video hosting websites of the pay-to-view model, however, the contents of a video are not disclosed, and the service is configured so that viewers have no way of knowing the contents of an item of video content, and must pay a fee unilaterally set by the video site before having any way of knowing the value of a video. Thus, users have no way of judging the value of video content, and must pay a unilaterally set fee in advance, which cannot be considered a fair transaction, and subjects users to risk.

Meanwhile, there also exist subscription-based services as typified by Netflix, Hulu, Amazon Prime Video, and Spotify (all registered trademarks). These services are set up so that the fees paid by a user increase proportionally to the length of time the service is used. The longer the service is used, the more the user is out of pocket, especially when continuously viewing the same content (video, music, etc.).

If the fee for such a subscription-based service is simply increased without any change to service offerings or content, the user ends up simply paying extra, which cannot be considered a fair transaction.

4. Models for Acquiring Paid Users Through Free Trials, Etc., and Drawbacks Thereof There also exist models for promoting the acquisition of paid users by offering users various premiums.

In such models, users are offered premiums such as free service for the first few months. However, the user is typically forced to register payment information at the start, and will automatically become a paid member unless the user cancels during the free period. This leads to the drawback of the user being unintentionally charged if the user forgets to cancel.

In Amazon Prime®, which combines web services and physical services, a membership fee (annual membership, paid annually or in monthly installments) is first paid in advance, after which the member receives free shipping for eligible merchandise (physical services) and the ability to enjoy some of the content of web services such as Amazon Prime Video and Amazon Prime Music. Although this service appears at first glance to offer video for free, it ultimately operates on a paid model since the user pays membership fees to be a Prime member.

In this service, moreover, one must separately become a paid member of the various individual services in order to enjoy the services in their entirety, including new shows and tunes on Amazon Prime Video and Amazon Prime Music. In other words, the service is set up in an arrangement close to an ad-based model, wherein some parts of the service are presented so as to appear free, and users are subsequently drawn into various paid services.

5. System Proposed by the Inventors

In the light of the circumstances described above, the inventors of the present application have previously proposed and filed applications for the inventions disclosed in patent documents 1 and 2 listed below.

In these proposals, streaming video is offered completely for free, viewers can offer tips for videos they enjoyed, and, if the user has decided to permit downloading of the video in response to payment of tips, the video can be downloaded as a reward for the tip.

However, these proposals permit downloading of videos as a reward, and can lack flexibility in terms of incentives for tipping.

PRIOR ART DOCUMENT

Patent Document

[Patent document 1] International Publication No. WO/2019/082409

[Patent document 2] International Publication No. WO/2019/083018

SUMMARY OF THE INVENTION

Problem to be Solved by the Invention

The present invention was conceived in view of the problems in the prior art, and has an object of providing an arrangement whereby video content can be provided in a manner that is fair to content consumers as well, and enables operators of video hosting websites and content providers to bring in revenue in a more flexible manner.

Means for Solving the Problem

In order to achieve the object proposed above, a first aspect of the present invention provides:

(1) a system for providing free streaming video playback to a user who is a content consumer, the system being characterized by comprising:

a tipping module configured to run in accordance with an operation of the streaming video playback without obstructing the abovementioned free streaming video playback; wherein only when a user who is a content provider has set in a settings interface whereby a specific number of two or more rewards is offered in response to a tip, the tip payment processing module verifies whether an amount set by the user who is the content consumer, or a default amount, is equal to or greater than a minimum tip amount set by the user who is the content provider when processing payment of the tip, and otherwise processes payment of the tip according to the amount entered by the user who is the content consumer, or the default amount, without verifying the minimum tip amount.

A second aspect of the present invention provides:

(2) a streaming video playback system comprising:

a video playback module configured to display a video, uploaded to a specific video hosting site by a user who is a content provider, on a user interface displayed on a computer of a user who is a content consumer so as to enable streaming playback of the video over the Internet;

a tipping module configured to run in accordance with a streaming playback operation of the video playback module without obstructing said streaming playback operation;

a reward download button/link display module configured to work in tandem with a tipping process performed by the tipping module; and a settings module configured to provide a settings interface that enables the user who is the content provider to set one or more different rewards in response to the tip, and to set a minimum tip amount only when a specific number of two or more rewards is offered;

wherein the tipping module comprises:

a tipping button/link display module configured to display an active tipping button/link on the user interface; and a payment processing module configured, in response to an operation of the displayed active tipping button/link by the user who is the content consumer, to process payment of a tip of a specific amount according to a default amount or an amount set by the user who is the content provider;

the payment processing module:

only when the user who is the content provider has set in the settings interface whereby a specific number of two or more rewards is offered, determines whether an amount set by the user who is the content consumer, or the default amount, is equal to or greater than the set minimum tip amount when processing payment of the tip, and otherwise processes payment according to the amount set by the user who is the content provider or the default amount without performing the abovementioned verification; and wherein the reward download button/link display module displays an active reward download button/link on the user interface in response to a tipping process being executed for the video, and allows a specific reward to be downloaded to and displayed on a computer of the user who is the content consumer, if the user who is the content provider has selected to offer the one or more rewards for tips; and does not display the active specific reward download button/link if the user who is the content provider has selected not to offer the one or more rewards for tips.

In accordance with aspects (1) and (2) of the present invention, it is possible for a user who is a content consumer to view streaming video content for free, for at least one reward out of one or more rewards to be received for a tip freely decided upon by the user, and for a minimum tip amount for receiving a specific number of two or more rewards to be received. As a result, it is possible to set a plurality of rewards to offer a wider range of rewards and increase the incentive to tip, and for a tip of an amount set as desired by a user to be offered for less than the specific number of two or more rewards, thereby making it clear that the rewards are not being sold, and that any payments are tips.

Apart from aspects (1) and (2) described above, the present invention provides the following preferred embodiments.

(3) The system according to (1) or (2), wherein:
the one or more rewards include at least downloading the uploaded video file.

(4) The system according to (1) or (2), wherein:
the one or more rewards include at least downloading an audio file of a video.

(5) The system according to (1) or (2), further comprising:
a content conversion module for generating an audio file by extracting audio from a video uploaded by the user who is the content provider.

(6) The system according to (1) or (2), further configured so that:
the user who is the content provider can upload content other than the video as a reward.

(7) The system according to (1) or (2), configured so that:
only a single amount can be set for the minimum tip amount, even if the specific number of two or more rewards is set.

(8) The system according to (7), further configured so that:
the minimum tip amount can be entered and edited as a result of the specific number of two or more being selected for the rewards.

(9) The system according to (1) or (2), wherein:
the reward download button/link display module displays an indicator corresponding to the downloadable reward as the reward download button/link.

(10) The system according to (1) or (2), wherein:
the reward download button/link display module displays in the interface detailed information on the one or more rewards set by the user who is the content provider when the reward download button/link is moused over.

(11) The system according to (10), wherein:
the minimum tip amount set by the content provider is displayed in the detailed information on the rewards.

(12) The system according to (1) or (2), wherein:
in addition to the tipping module, the system comprises an ad display module configured to display a specific ad on the user interface before and/or during playback of the video in tandem with a video playback operation performed by the video playback module; and wherein the system determines either to launch the tipping module or to launch the ad display module according to default or a setting selected by the content provider.

(13) The system according to (12), wherein:
the system determines either to launch the tipping module or to launch the ad display module.

Characteristics other than those set forth above will be apparent from the following description and drawings of embodiments of the invention.

BRIEF DESCRIPTION OF THE DRAWINGS

FIG. 9 is a schematic illustration of a video upload settings screen.

FIG. 9A is a schematic illustration of a video upload settings screen.

FIG. 16A is a schematic illustration of the relationship between the settings in a reward settings screen and the display of a tipping button.

FIG. 16c is a schematic illustration of the relationship between the settings in a reward settings screen and the display of a tipping button.

DETAILED DESCRIPTION OF THE INVENTION

An embodiment of the present invention will be described hereafter.

Figure 1:
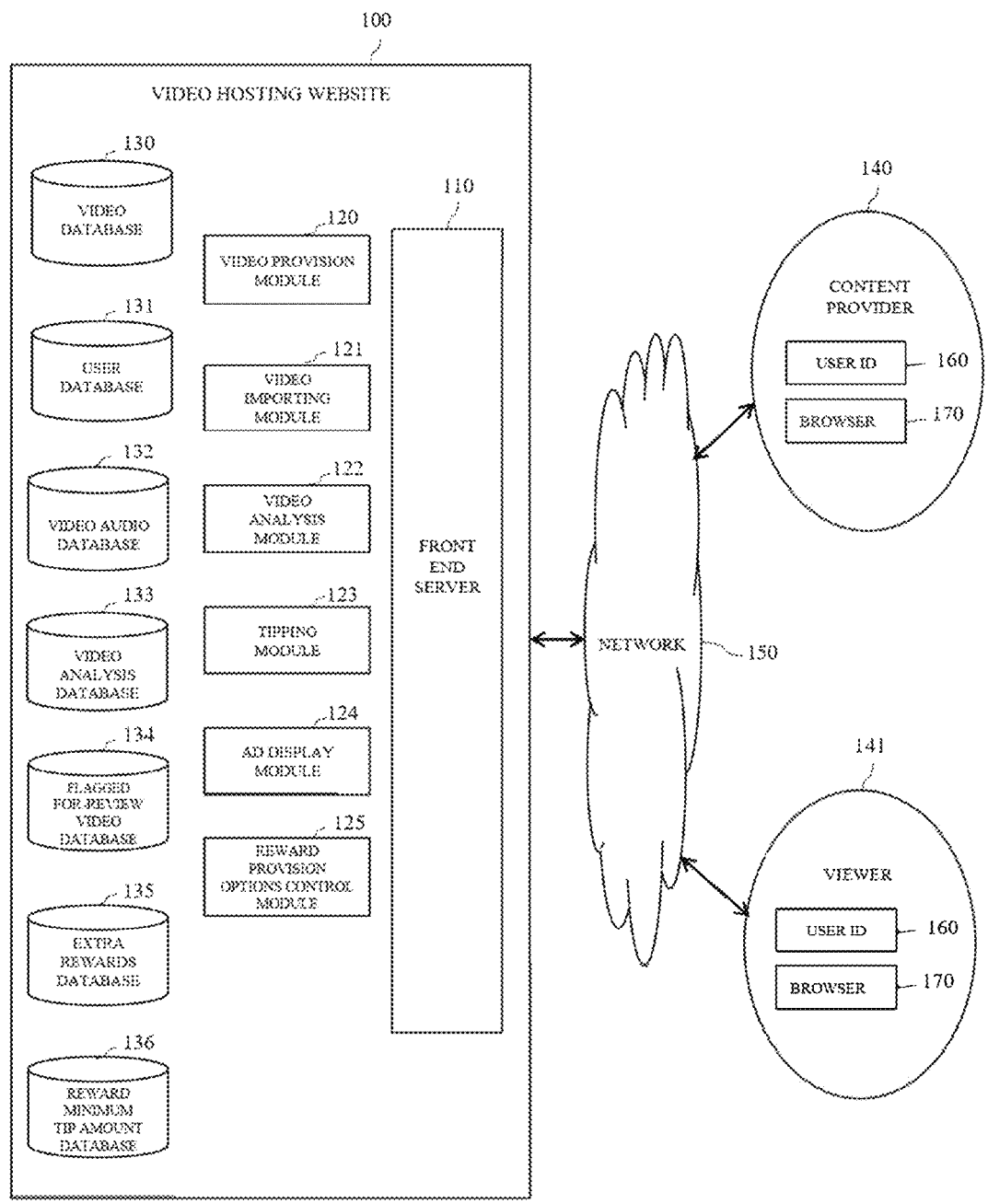
FIG. 1 is a schematic illustration of the system configuration of a video hosting server according to one example of the present invention.

FIG. 1 is an illustration of a system configuration according to the present embodiment.

1. System/Server Configuraton

A video hosting website 100 (the system of the present invention) comprises: a front end server 110 for providing a user interface; and, as a back end for processing video playback and tipping processes; a video provision module 120, a video importing module 121, a video analysis module 122, a tipping module 123, an ad display module 124, a reward provision options control module 125, and various databases including a video database 130, a user database 131, a video audio database 132, a video analysis database 133, a flagged-for-review video database 134, an extra rewards database 135, and a reward minimum tip amount database 136.

Numerous functions known in the art, such as firewall, load balancer, application server, authentication server, fault bypass server, and site management tools, will not be shown in the present embodiment in order to avoid confusion regarding the characteristics of the present invention, but naturally may be provided, as appropriate.

The front end server 110 and the modules 120-125 are installed as a program executed by the computer making up the video hosting website 100; this program is expanded in memory by the CPU of the computer in which the program is installed, and executed, as appropriate, to form the various elements of the present invention. The computer on which the server program is installed is preferably a server-class computer comprising a network interface, a peripheral interface, and other elements known in the art. For example, the computer runs on an operating system, such as Linux®, comprising a generally high-performance CPU and a disk storage device for memory.

Other types of computers may of course be used, and it is anticipated that more powerful computers developed in the future can be configured as described herein. It is also possible to provide a function installed through one of the elements using a computer program product stored on a computer-readable physical storage medium (e.g., ROM, RAM, hard disk, SSD, or magneto-optical medium).

The video hosting website 100 is connected via a network 150 to users in the form of a content provider (individual, corporation, group) terminal 140, and a viewer (individual, corporation, group) terminal 141. The content provider terminal 140 and the viewer terminal 141 (content consumer) run a browser 170 on a computer, portable terminal, etc., and connect to the front end server 110 over the network 150. Typically, the network 150 is the Internet, but may include any combination of LANs, MANs, WANs, mobile, wired or wireless networks, private networks, cellular networks (e.g., the Long-Term Evolution [LTE] network), CDNs (content delivery networks), and virtual private networks. The front end server 110 can be connected to over the network 150, which can be any network, without limitation.

In FIG. 1, the content provider terminal 140 and viewer terminal 141 (content consumer), as well as their respective user IDs 160 and browsers 170, are shown as single units; however, it goes without saying that an extremely large number (for example, millions) of users can be supported and allowed to communicate with the video hosting website 100 at any time.

In FIG. 1, the content provider terminal 140 and the viewer terminal 141 are shown separately, but the same use may be both a content provider and a viewer, in which case the terminals 140, 141 will be the same terminal.

The terminals 140, 141 may include a variety of different computer devices. Examples of the terminals 140, 141 include PCs, laptops, smartphones, tablets, information terminals, portable information terminals, portable telephones, mobile telephones, etc. The technology of the relevant field is naturally not limited to the abovementioned devices.

The browser 170 can include any application by which a user can access web pages on the World Wide Web. Suitable applications are Apple Safari®, Google Chrome®, Android®, Microsoft Edge®, Internet Explorer®, and any applications adapted so as to be capable of accessing web pages on the World Wide Web, including smartphone and tablet application software. The browser 170 also includes suitable video players, such as HTML5 Player and Adobe Systems' Flash (both registered trademarks), as well as any other player that is usable on the video hosting website 100 and compatible with video film format. Alternatively, a standalone program independent of the browser 170 may access videos.

Records of all registered users, including the users of the terminals 140, 141, are registered and saved in the user database 131 of the video hosting website 100. The video hosting website 100 uses the user database 131 to maintain records of all registered users. Names, user names, channel names, passwords, email addresses, tip payment information (credit card numbers, online payment information, etc.), tipping settings, tip receipt information (bank account, etc.), tipping records, tip receipt records, video viewing records, video upload records, video upload settings, rewards settings, extra rewards settings, reward minimum tip amount settings, author records, violation records, and ad settings information (whether or not the user wishes to receive ad revenue for uploaded videos, and settings for doing so) are stored in the records of the registered users.

Records are also included for users who simply watch videos without being registered on the video hosting website 100.

2. Site Registration and User ID

It is general practice in web service user registration, not limited to the video hosting website 100, to identify users by email address, telephone number, and registered social media accounts (Facebook, etc.), and later input the information necessary to use the site services, such as legal name, sex, address, payment information, user name, channel name, etc, to register with the site. After registering with the site, a user is given an ID (identifier) 160, and can utilize the services of the video hosting website 100.

As this method of site registration and ID 160 acquisition is standard for website registration at present, it will not be shown in order to avoid confusion regarding the characteristics of the system of the present invention. Other methods of website registration and ID acquisition invented in the future can be applied to the system of the present invention as long as they are methods in which users are identified by user IDs.

3. Unregistered Site Users

Users not registered with the video hosting website 100 can view videos, but must register with the video hosting website 100 and obtain a user ID 160 in order to utilize services such as paying tips, receiving tips, uploading videos, downloading videos (rewards), downloading video audio (rewards), uploading extra reward data, receiving extra rewards, setting reward minimum tip amounts, rating videos, and posting comments; thus, the operator of the video hosting website 100, through the user interface (not shown) on the front end server 110, notifies unregistered users of the option of registering with the site, and encourages them to do so.

4. Uploading Videos

A registered user of the video hosting website 100 (one who has obtained a user ID 160) is capable of becoming a content provider; to upload digital content to the video hosting website 100, the content provider launches the content provider terminal 140, and connects over the network 150 to the video importing module 121 via a video settings user interface 900 generated by the front end server 110.

Figure 4:
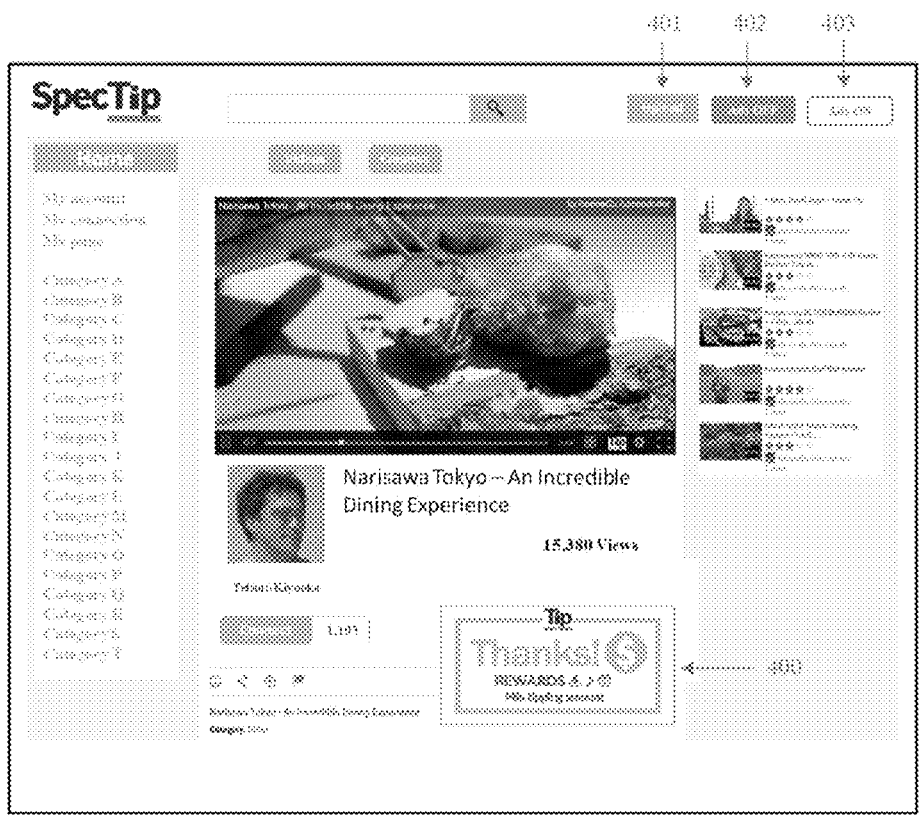
FIG. 4 is a schematic illustration of a video playback interface of the same.

The user interface 900 can be accessed by, for example, clicking the video "Upload" button 401 in the video viewing interface shown in FIG. 4.

When the content provider clicks the video "Upload" button 401 in the user interface, it is confirmed whether the content provider is logged into the video hosting website 100. If the content provider is logged in, the user ID 160 is identified, and if the content provider is not logged in, a login page is displayed (not shown in the drawings), the provider is made to log in, and the user ID 160 is identified. Unregistered users of the video hosting website 100 are directed to a user registration page (not shown in the drawings) to register as a user and obtain a user ID 160, after which the user ID 160 is identified at login.

Figure 9:
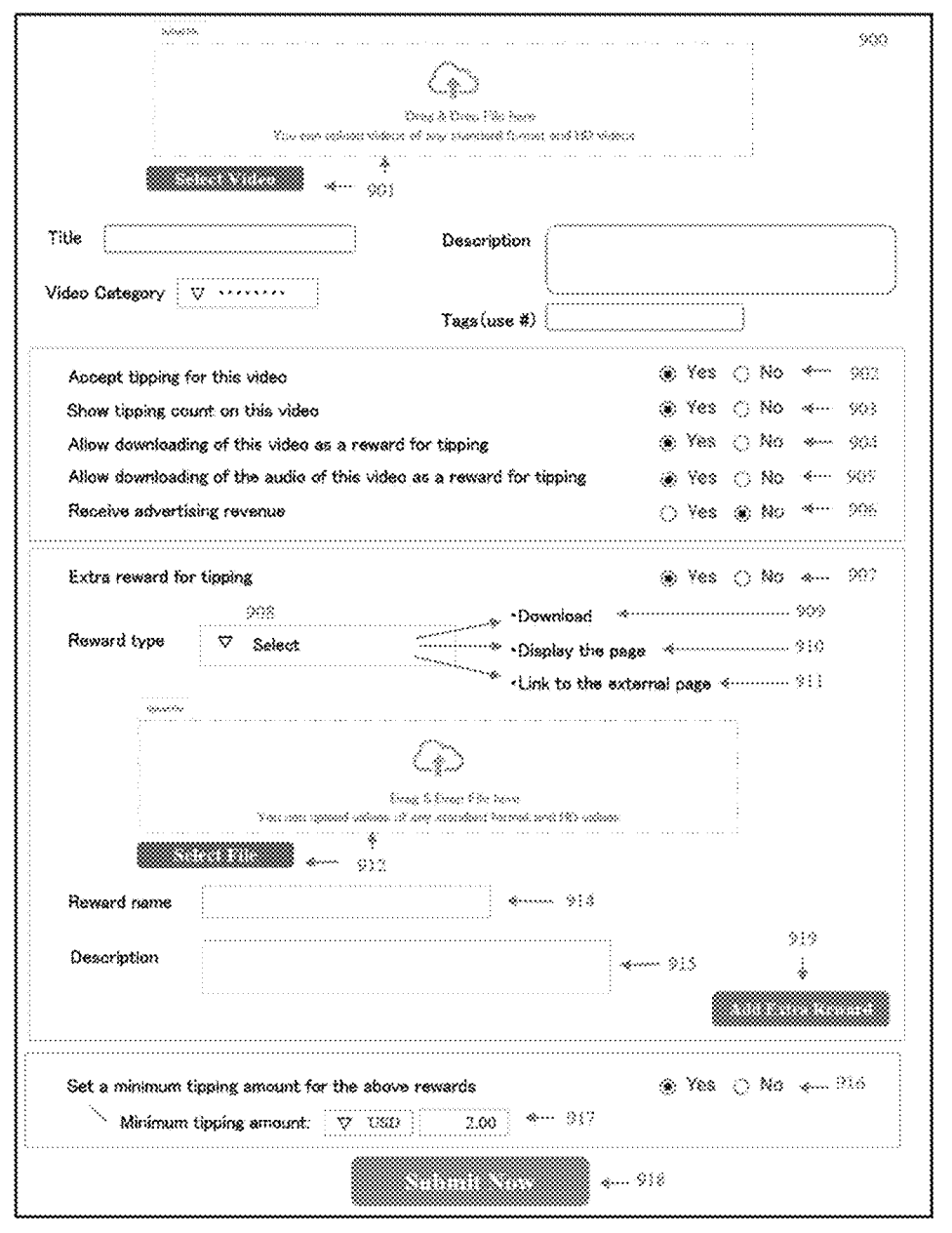
Figure 9A:
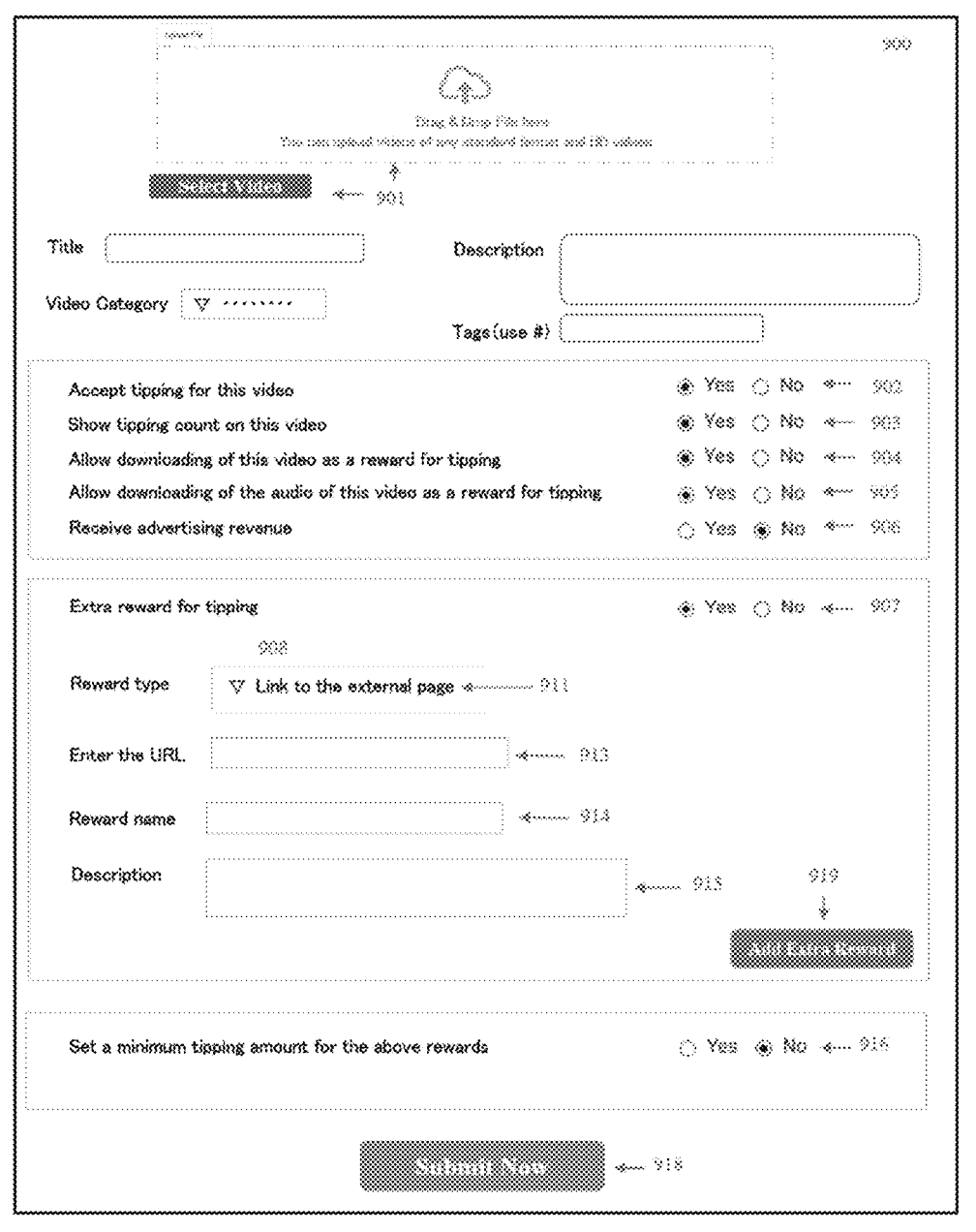
Figure 9B:
FIG. 9B is a schematic illustration of a video upload settings screen.

In the user interface 901 in the user interface 900 shown in FIG. 9, as will be discussed in detail hereinafter, the video data to upload can be designated by selecting the storage location of the video or dragging and dropping the file, and video title, description, tags, and category can be designated.

One can also select and designate whether to accept tips for a video (tip acceptance option 902), whether to display the number of received tips (tip count display option 903), whether to permit downloading of the video by (offer a reward to) tipping users (video download reward option 904), whether to permit downloading of the audio of the video by (offer a reward to) tipping users (video audio download reward option 905), whether to accept paid ads (ad revenue option 906), whether to offer an extra reward to tipping users (extra reward option 907), and whether to set a reward minimum tip amount for offering rewards (reward minimum tip amount option 916).

When a Submit Now button 918 in the interface is clicked, the video importing module 121 uploads the video data designated in 901 described above and stores the data in the video database 130, and the records in the user database 131 are updated and saved.

The options settings designated using the user interface 900 cause the associated modules to operate; these option settings and operation will be described in detail hereinafter.

The video importing module 121 also assigns an ID (identifier) to and performs initial processing upon the uploaded video. This processing includes format conversion (encoding, transcoding) and compression. The processing also includes data processing involving tagging the user ID 160, video ID, tipping settings set in the user interface, as well as metadata such as video title, description, tags, categories, language, geo-blocking, age restrictions, and video length.

Examples of uploaded digital content items include video, audio, and combinations of video and audio. Alternatively, the digital content item may be a still image such as a JPEG, PNG, or GIF file, or a text file.

The item may of course also be live video (streaming data). For simplicity and to describe the present embodiment, the uploaded digital content item will be referred to as a "video", a "video file", "video data", or a "video item", but these terms are not intended to limit the types of digital content items that can be uploaded.

The video analysis module 122 then analyzes the tagged metadata. For this analysis, the module checks for any prohibited words, violence, sexual content, etc., violating terms that have been set by the video hosting website 100 and stored in the video analysis database 133, and also checks for copyrights.

Video metadata for previous violations of terms is stored in the video analysis database 133, as is copyright information independently obtained by the operator of the video hosting website 100.

Information on movie companies, music labels, television stations, artists, and other music copyright holder registered with the video hosting website 100 as users is also converted to metadata and stored, and copyright infringements are also checked for. After analysis, the video data without problems is associated with a user ID 160, who is the content provider 140, and stored in the video database 130, and at the same time the record in the user database 131 is updated and saved.

A video that is judged problematic is stored in the flagged-for-review video database 134, the operator of the video hosting website 100 checks the video again, and, if there are no problems, the video data is stored in the video database 130 in association with the user ID 160 of the content provider, and, simultaneously, the record in the user database 131 is updated and saved.

Problematic videos are deleted after being checked by the operator of the video hosting website 100, metadata for problematic videos is stored along with the user ID 160 of the content provider in the video analysis database 133 as violation data, and the user violation history for the user ID 160 of the content provider is updated in the user database 131.

Video authorship is made up of extremely complex rights, and it may in practice be difficult to detect all copyright infringements using just the video analysis module 122 and the video analysis database 133. Ultimately, therefore, these are addressed on a case-by-case basis through regular checks by the operator of the video hosting website 100 and third-party complaints, and, as necessary, deletion of the video in question or suspension or banning of the user ID 160.

5. Viewing Videos

The viewer can run the browser 170 on the viewer terminal 141 and connect to the front end server 110 to view videos that have been uploaded from the content provider terminal 140 to the video database 130.

Using the interface displayed by the front end server 110 as illustrated in FIG. 4, the viewer selects and views posted videos according to category, view count ranking, rating ranking, and the settings and video viewing history of the viewer on the viewer terminal 141, or the viewer inputs search words into a video search system on the front end server 110, videos (titles, descriptions, artist names, tags, etc.) matching the metadata stored and distributed by the video database 130 and the search words inputted by the viewer are displayed as search results. The viewer is thus capable of selecting and viewing videos on the viewer terminal 141. When the viewer selects a specific video, the video ID is sent to the video provision module 120, the video data is retrieved from the video database 130, and the video provision module 120 sends the video data to the viewer terminal 141 for viewing.

As these methods of selecting and searching for videos are standard on video hosting websites, they will not be shown in order to avoid confusion regarding the characteristics of the present invention.

The video view count by a specific viewer terminal 141 is recorded by the video provision module 120, and stored in the video database 130 in association with the video and the user ID of the viewer.

6. Video Playback and Tipping Module

Figure 2:
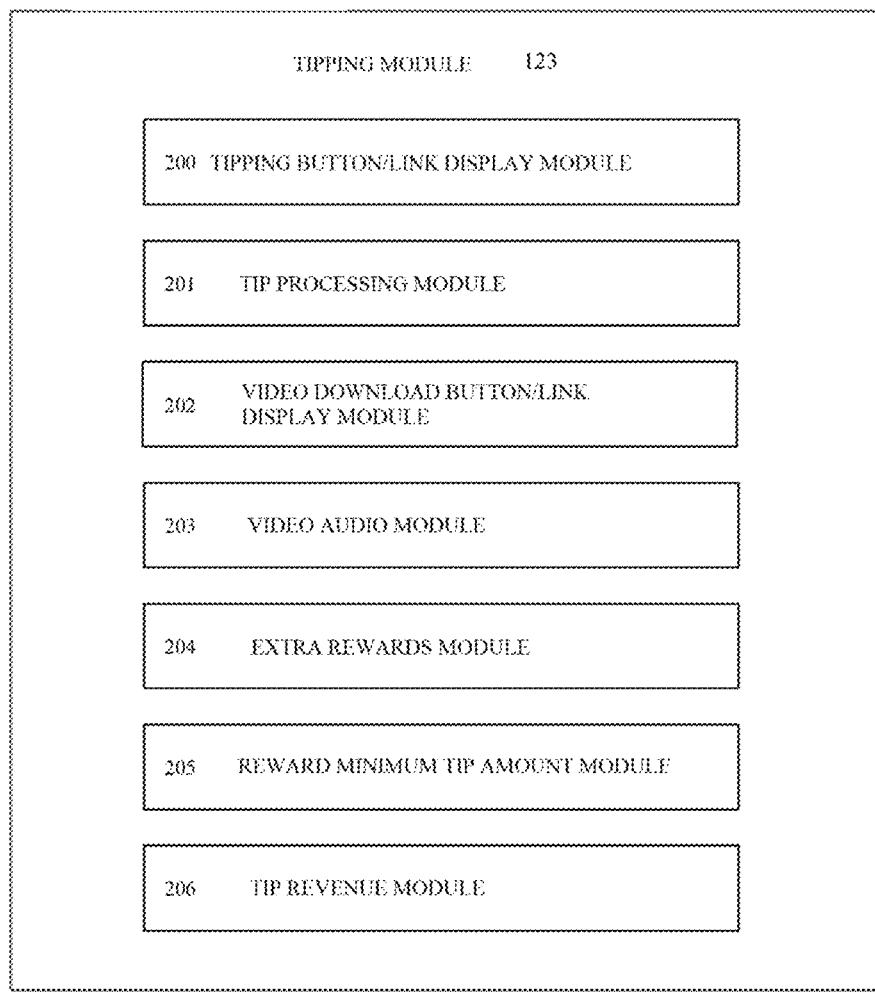
FIG. 2 is a schematic illustration of a tipping module of the same.

FIG. 2 is a block diagram of the tipping module 123 shown in FIG. 1.

In the embodiment shown in FIG. 2, the tipping module 123 comprises a tipping button/link display module 200, a tip processing module 201, a video download button/link display module 202, a video audio module 203, an extra reward module 204, a reward minimum tip amount module 205, and a tip revenue module 206.

Figure 3:
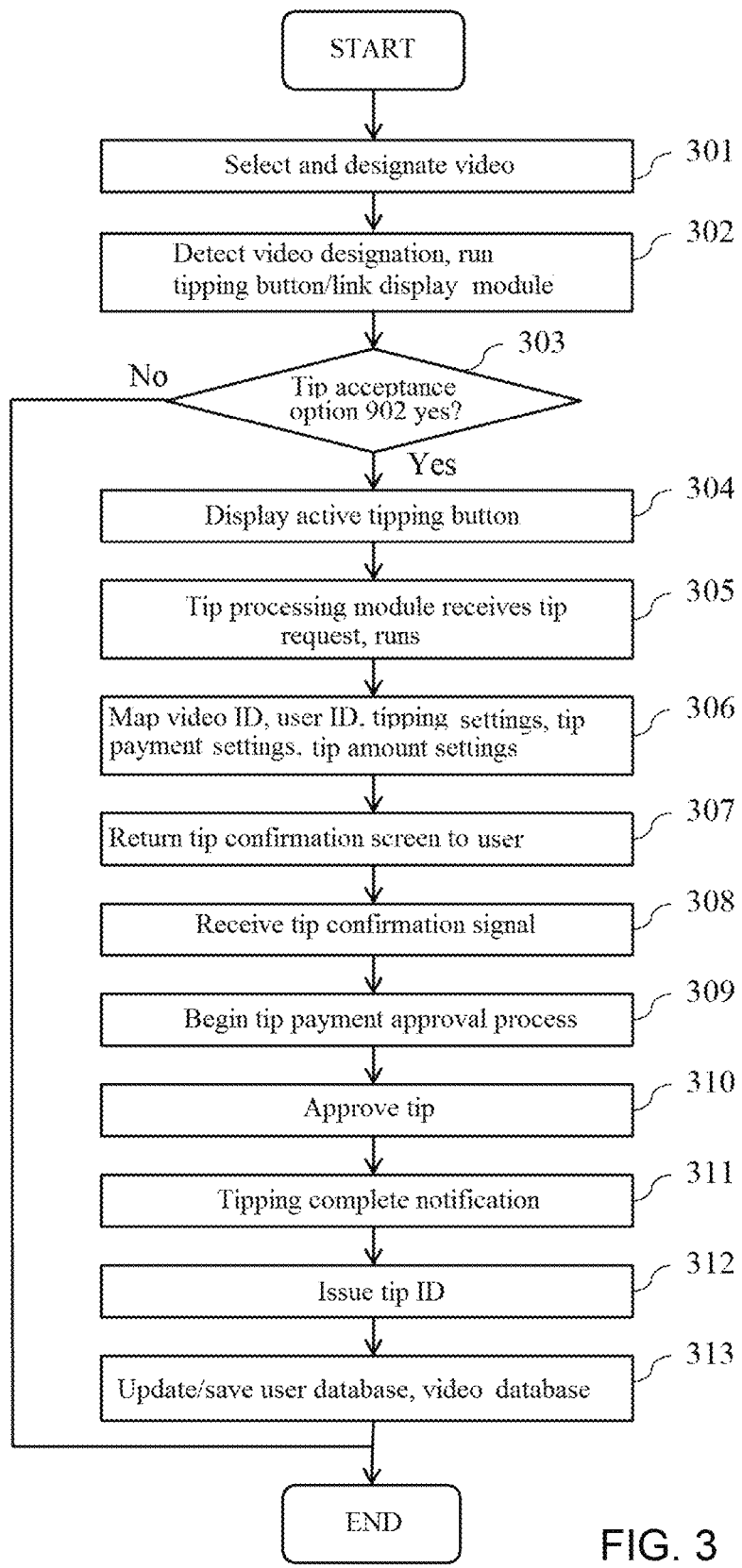
FIG. 3 is a flowchart of a video playback process in the same.

FIG. 3 is a flowchart of a process performed by the tipping module 123, which works together with the video selection/designation operation performed by the viewer terminal 141.

When a viewer selects and designates a video for viewing (step 301), the tipping button/link display module 200, detecting that a video has been designated, runs (step 302), it is confirmed that a selection has been made to accept tips (Yes) in the tip acceptance option 902 made for the reward provision options control module 125 in the user interface 900 for the video upload (step 303), and an active tipping button 400 as shown in FIG. 4 is displayed as a result (step 304), allowing the viewer to leave a tip.

Because other, conflicting remuneration payment means, such as the ad display module 124 in this example, are installed in the system of the present invention, the reward provision options control module 125 stops the operation or inhibits the launching of the ad display module 124 so that no ads (of any sort, including in-stream ads) are displayed.

In the present embodiment, in other words, the reward provision options control module 125 performs control so that either the tipping button/link display module 200 or the ad display module 124 operates, according to the setting (Yes or No) of the tip acceptance option 902.

The ad display module 124 displays ads (in-stream ads, etc.) based on the information registered for a user over videos uploaded by the user as the videos are being played back, and may have the same configuration as in existing ad-supported video hosting websites.

When the ad display module 124 operates, an "Ads OFF" button may be provided as shown, for example, beside the video "Upload" button 401 in FIG. 4, the reward provision options control module 125 performs control so as to stop the operation of the ad display module 124, with the result that the reward provision options control module 125 performs control so as to launch the tipping button/link display module 200. Such a button may also be set for the video hosting website 100 as a whole.

The system may also be configured so that, when the tipping button/link display module 200 is operating (the tipping button 400 is active), the reward provision options control module 125 displays an "Ads ON" button 403, as shown in the drawing, and the button may be clicked to cause the reward provision options control module 125 to stop the operation of the tipping button/link display module 200, the tipping button 400 is not displayed (rendered inactive), and the ad display module 124 is thereby launched, in the opposite of the process described above.

In this case, either the tip acceptance option 902 or the ad revenue option 906, but not both, as described above, is activated; the ad display module 124 launches; the ad revenue option 906 is set to Yes; the tip acceptance option 902, tip count display option 903, video download reward option 904, video audio download reward option 905, extra reward option 907, and reward minimum tip amount option 916 are forcibly set to No and deactivated; and the reward provision options control module 125 performs control so that the content provider cannot select or designate these options. As a result, when the operation of the ad display module 124 is stopped using the "Ads OFF" button 402 and the tipping button/link display module 200 exclusively operates, the tip acceptance setting 902 is forcibly set to Yes, the ad revenue option 906 is forcibly set to No, and the reward provision options control module 125 performs control so that the content provider cannot select or designate these options.

As a result, the video hosting website becomes completely ad-free, including in-stream ads. In this case (ads not shown/ad revenue option 906 set to No), the content provider is capable of selecting and designating Yes or No for the video download reward option 904, video audio download reward option 905, extra reward option 907, and reward minimum tip amount option 916 for tipping-enabled videos. The setting and operation of rewards will be described in detail hereinafter.

Next, when the viewer clicks on the tipping button 400 on the viewer terminal 141 (FIG. 4), the tip processing module 201 runs in response to the tip request (step 305), the tip processing module 201 maps the video ID, user ID 160, tipping settings, tip payment settings, and tip amount settings (step 306), and a tipping details confirmation screen (not shown) is returned to the viewer terminal 141 (step 307).

When the viewer has confirmed the tip details and clicks a confirm tipping button (not shown) on the viewer terminal 141, the tip processing module 201 receives the confirmation signal (step 308) and starts a tip payment approval process through the viewer terminal 141 (step 309).

If the viewer's tip payment setting is set to credit card, electronic payment, or the like, the tip processing module 201 sends a payment approval request to the payment company, and obtains payment approval from the payment company (step 310).

If the payment cannot be approved, a payment error message (not shown) is displayed on the viewer terminal 141.

When the tip payment has been approved, a tipping complete message is displayed on the viewer terminal 141 (step 311), a tip ID is simultaneously issued (step 312), and the information in the user database 131 and the video database 130 are updated and saved in association with the user ID 160 and the video ID (step 313).

Figure 5:
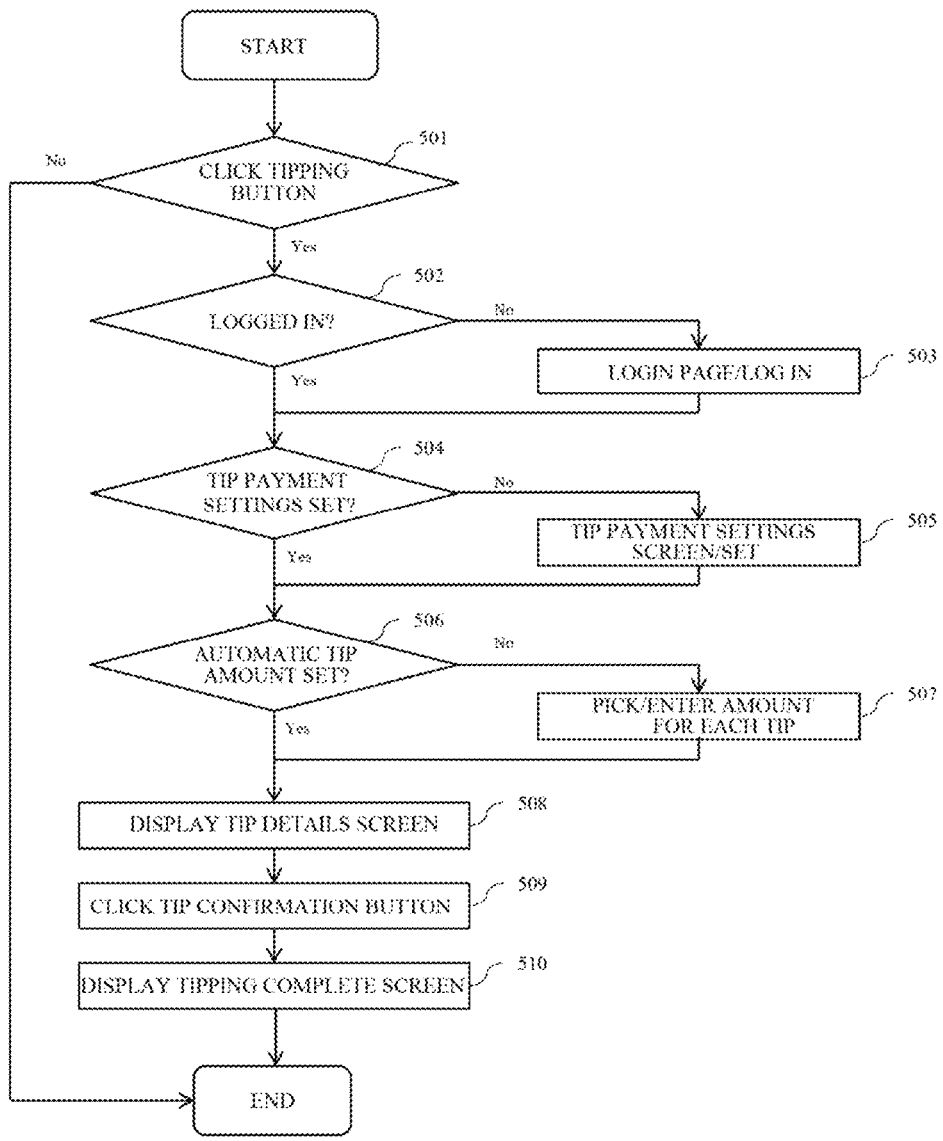
FIG. 5 is a flowchart of a tipping process in the same.

FIG. 5 is a flowchart of a tipping process in accordance with viewer tipping settings that accompanies the process performed by the tipping module 123 in FIG. 3.

When the viewer clicks the active tipping button 400 (FIG. 4) on the viewer terminal 141 (step 501), the process continues to step 502, and the tip processing module 201 confirms whether the viewer terminal 141 is logged into the video hosting website 100.

If the viewer device 141 is logged in, the user ID 160 is identified, and, if the viewer device 141 is not logged in, the process continues to step 503, in which the viewer is made to log in, and the user ID 160 is similarly identified. Users not registered with the video hosting website 100 are directed to a user registration page (not shown), and the user is registered and issued a user ID 160, then logged in.

Figure 6:
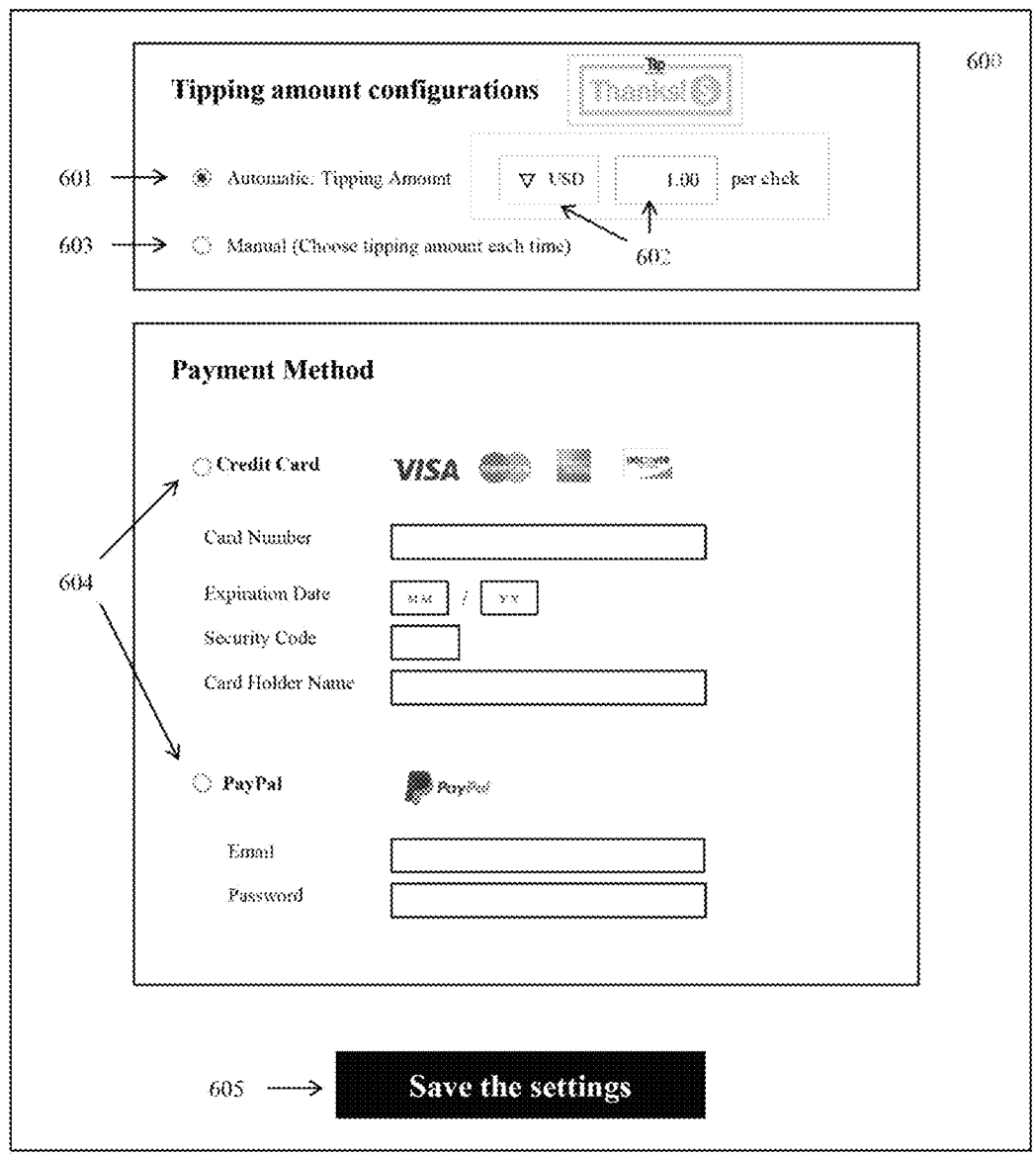
FIG. 6 is a schematic illustration of a payment means settings screen.

Next, in step 504, the tip processing module 201 confirms the viewer's tip payment settings. A viewer who has set a tip payment option is sent to step 506, and a viewer who has not yet set a tip payment option is sent to step 505, in which the user sets a payment means for credit card/electronic payment 604 for the tip payment setting on the user interface 600 shown in FIG. 6, and is then sent to step 506.

There is an area for setting a tip amount per click of the tipping button 400 in the upper part of the tip payment settings user interface 600, and an area 604 for setting payment method in the lower part.

Either an automatic tipping setting 601 or a manual tipping setting 603 is selected and designated for tips per click of the tipping button 400.

The automatic tipping setting 601 presets a tip amount for each click of the tipping button 400, with the amount being set to a fixed amount. In an input box 602, a currency is selected and an amount is inputted and set for the fixed amount.

In the manual tipping setting 603, the tip currency and amount are inputted manually each time the tipping button 400 is clicked, with the tip amount being decided upon each time.

In the lower area 604, credit card or electronic payment (e.g.: PayPal, etc.) is selected and set, and payment information is inputted. When all selections and inputs have been made and a "Save the settings" button 605 is clicked, the tipping button/link display module 200 runs, and the payment settings for the tipping button 400 are saved in the user database 131.

After finalizing the tipping settings for the tipping button 400, a viewer can check and alter the settings for the tipping button 400 by logging into a user account page (not shown) and using a tipping settings button (not shown) to access the user interface 600.

In step 506, the tip processing module 201 confirms the tipping button 400 settings set by the viewer.

Once the amount per click setting 602 for the automatic tipping setting 601 has been selected, the viewer is sent to step 508. If the manual tipping setting 603 is selected, the viewer is sent to step 507, inputs the tip amount, and is then sent to step 508.

In step 508, the tip processing module 201 displays a tip details confirmation screen (not shown) on the viewer terminal 141. Once the viewer has confirmed the tip details and clicked the tip confirmation button (step 509), a tipping complete screen is displayed, and payment of the tip is complete (step 510).

The tip processing module 201 then accesses the video database 130, and updates tip information (dates, amounts, etc.) for the video.

If the viewer does not click the tipping button 400 in step 501, the tip processing module 201 will not run. If the content provider has opted not to accept tips (designated No) for the tip acceptance option 902 in the user interface 900, the reward provision options control module 125 detects this fact and performs control, the tipping button 400 is not be displayed, and the tipping module 123 does not run.

7. Controlling the Reward Settings User Interface

The control of the user interface provided on the content provider terminal 140 in the process described in section 4, "Uploading videos" will now be described.

The present invention is provided with the aforementioned reward provision options control module 125, which causes the tip acceptance option 902, tip count display option 903, video download reward option 904, video audio download reward option 905, extra reward option 907, and reward minimum tip amount option 916 in the user interface 900 shown in FIG. 9 to work together.

Specifically, only if Yes has been designated for the tip acceptance option 902, the reward provision options control module 125 displays an active tip count display option 903, video download reward option 904, video audio download reward option 905, and extra reward option 907, allowing these options to be selected and designated, and, if No has been designated for the tip acceptance option 902, the tip count display option 903, video download reward option 904, video audio download reward option 905, extra reward option 907, and reward minimum tip amount option 916 are inactive, and cannot be selected and designated.

Specifically, because ad revenue is a means of receiving remuneration that conflicts with tip payments, the reward provision options control module 125 sets the ad revenue option 906 to No if the content provider has selected Yes for the tip acceptance option 902, and makes it inactive so as not to be selectable.

As a result, no ads (of any sort, including in-stream ads) are displayed in the video. In other words, the reward provision options control module 125 of the present invention is configured to run either the tip acceptance option 902 or the ad revenue option 906 depending on the setting (Yes or No) for the tip acceptance option 902.

As discussed above, the reward provision options control module 125 is configured so that, only for videos for which the content provider has permitted tipping, the user, using the user interface 900, selects, designates, and sets whether to offer video downloading, video audio downloading, and extra rewards as rewards and to set a minimum tip amount to receive rewards, or to not offer video downloading, video audio downloading, and extra rewards and not set a minimum tip amount to receive rewards.

The reward minimum tip amount option 916, video download reward option 904, video audio download reward option 905, and extra reward option 907 work together, and, only when Yes has been set for the option to offer two or more (corresponding to the specific number of two or more referred to in claim 1) of these rewards, an active reward minimum tip amount option 916 is displayed, allowing the user to make and set a selection. Because a user can opt to offer multiple rewards in the extra reward option 907, an active reward minimum tip amount option 916 is also displayed if two or more (a specific number of two or more) extra rewards only are offered, allowing the minimum amount to be selected and set.

If the user opts to offer (Yes) only one of these rewards, an active reward minimum tip amount option 916 is not displayed, making it impossible to select and set this option. The purpose of this control over the reward minimum tip amount is to clearly define video download rewards, video audio download rewards, and extra rewards as rewards (premiums) rather than products or services for sale. The reasons for this will be discussed in detail hereinafter.

Figure 7:
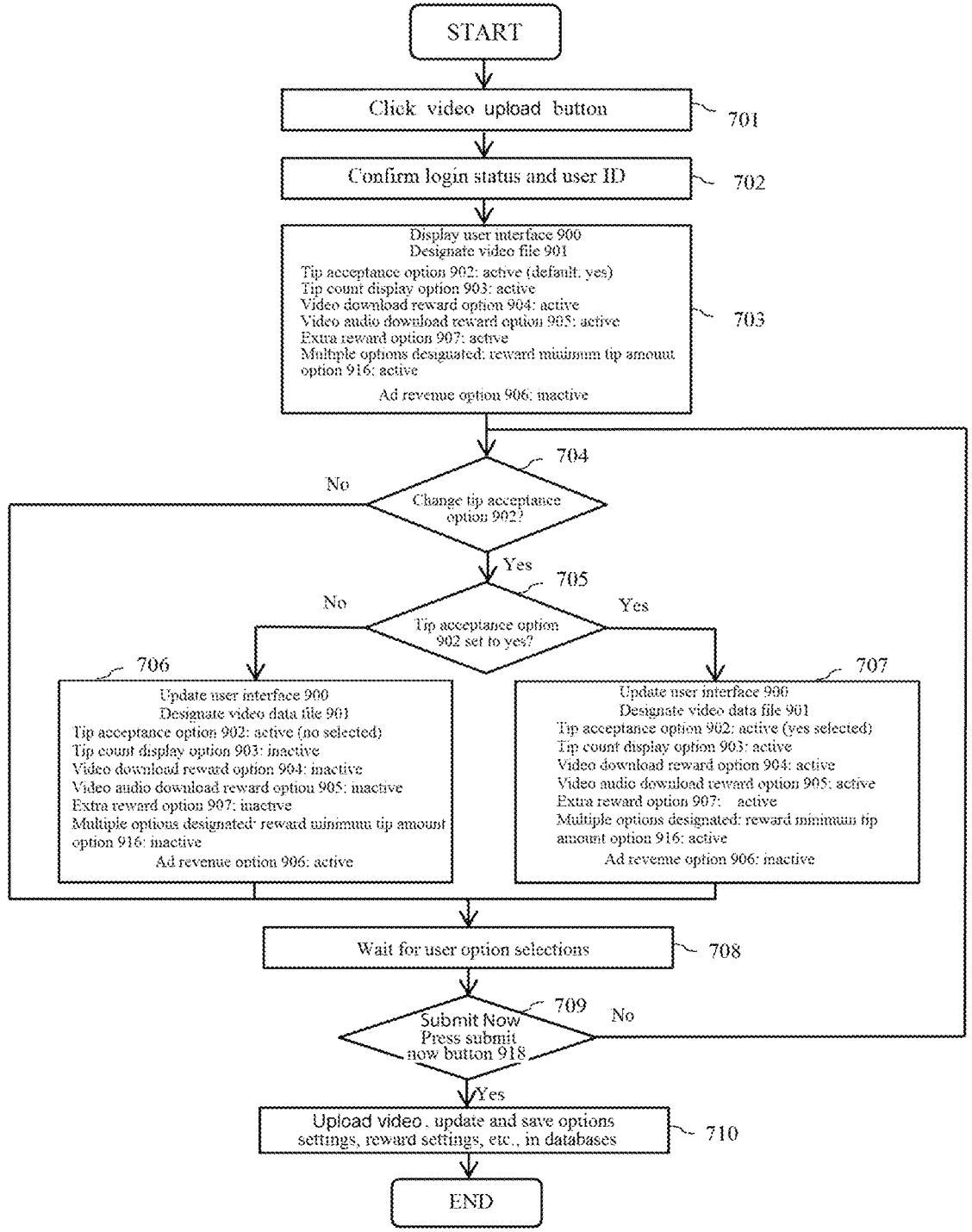
FIG. 7 is a flowchart of a video download process and a reward setting process.

Options settings associated with the video uploading described above, and the operation of the reward provision options control module 125, described above will now be described in greater detail with reference to the flowchart in FIG. 7.

First, in step 701, the content provider clicks, for example, the video "Upload" button 401 in the user interface shown in FIG. 4, whereupon the reward provision options control module 125 confirms whether the content provider is already logged in (702), has the content provider log in if not logged in, and displays a specific user interface 900 (FIG. 9) according to the ID 160 of the user (step 703).

Although the process is not shown in the drawings, if the user is not registered with the video hosting website 100, the user is directed to a user registration page (not shown), is registered, and acquires a user ID 160, which is subsequently identified when logging in (702).

The user interface 900 is displayed (step 703), and the video to be uploaded is designated in 901. Out of the multiple options 902, 903, 904, 905, 906, 907, and 916 selectable by the content provider in the default display of the user interface 900, the reward provision options control module 125 sets the tip acceptance option 902, tip count display option 903, video download reward option 904, video audio download reward option 905, and extra reward option 907 to active, and selects no for the ad revenue option 906 and sets the option to inactive so that it cannot be selected (step 703).

In this embodiment, Yes is selected for all of the active options 902, 903, 904, 905, and 907, and 916 is active as a result of multiple options being selected, and set to Yes. The ad revenue option 906 is forcibly set to No, and is in an inactive state.

Next, if the content provider changes the tip acceptance option 902 to No on the terminal 140, this is detected in steps 704, 705, and the display on the user interface 900 is updated (step 706).

Specifically, in this case, the tip count display option 903, video download reward option 904, video audio download reward option 905, extra reward option 907, and reward minimum tip amount option 916 are set to inactive, and the ad revenue option 906 is set to active in their place so that a selection can be made.

As described above, No is selected for the ad revenue option 906 by default.

If the content provider changes the tip acceptance option 902 to No, then back to Yes, this is detected in steps 704, 705, and the display on the user interface 900 is updated, as shown in step 707.

Specifically, in this case, the tip acceptance option 902, tip count display option 903, video download reward option 904, video audio download reward option 905, and extra reward option 907 are set to active, and the ad revenue option 906 is set to No and rendered inactive and unselectable.

Next, the reward provision options control module 125 waits for the user's option selections (step 708), and, when the Submit Now button 918 is clicked (step 709), the video importing module 121 uploads the video data designated in 901 described above and stores the data in the video database 130, and the records in the user database 131 are updated and saved (step 710). Simultaneously, the reward provision options control module 125 confirms the option settings selected by the content provider, runs the modules for the various options according to the options settings, the data and settings for the various options are saved in the various databases, and, simultaneously, the options settings are also saved in the user database 131, and the records are updated and saved (step 710). The various options settings and the operation thereof will be described in detail hereinafter for each option.

In accordance with this arrangement, when Yes is set for the tip acceptance option 902, the video download reward option 904, video audio download reward option 905, and extra reward option 907 become active, making it possible to select the options to offer a video download reward, offer a video audio download reward, and offer an extra reward, or to not offer a video download reward, not offer a video audio download reward, and not offer an extra reward, for a tipping-enabled video (steps 703, 707).

8. Video Download Rewards

The present invention is provided with a video download reward function, allowing the content provider to select and designate Yes or No for the video download reward option 904 in the user interface 900. As described above, only when the content provider has set the tip acceptance option 902 to Yes, the reward provision options control module 125 displays an active video download reward option 904, allowing a selection to be made and set, and the ad revenue option 906 is forcibly set to No and rendered inactive so that it cannot be selected.

If the tip acceptance option 902 is set to No, the reward provision options control module 125 forcibly sets the video download reward option 904 to No and renders it inactive so that it cannot be selected, and the ad revenue option 906 is set to Yes.

The setting and operation of the video download reward option 904 will now be described in greater detail with reference to the flowchart in FIG. 7.

As described in the previous section, the content provider clicks on the video "Upload" button 401 (step 701) and logs in, and the user ID 160 is identified (step 702). When the content provider sets the video download reward option 904 to Yes (step 707), the system waits for the content provider's option selections (step 708), the Submit Now button 918 is pressed (step 709), and the settings are saved (step 710); the reward provision options control module 125, which controls these options, runs, detects that the tip acceptance option 902 and the video download reward option 904 have been set to Yes, and conveys this information to the tipping button/link display module 200; and a tipping button 400 for the video is generated in the user interface (FIG. 8), and a reward indicator (REWARDS) 800 and video download reward indicator 801 are displayed.

This enables the viewer to confirm on the terminal 141, before giving a tip, that a video download reward is offered for the video.

Figure 8:
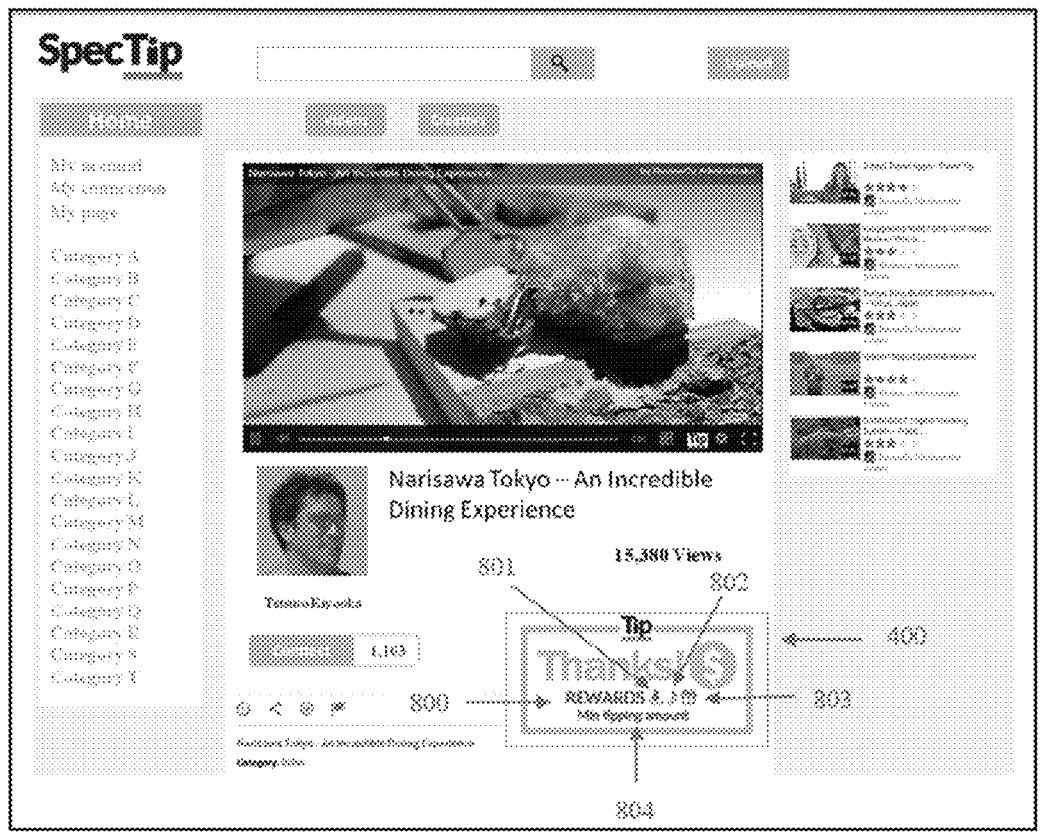
FIG. 8 is a schematic illustration of a video playback interface of the same.

When the video download reward option 904 is set to No, and this setting has been saved (step 710), the reward provision options control module 125 detects this fact and performs control so that the reward indicator (REWARDS) 800 and video download reward indicator 801 are not displayed in the tipping button 400 for the video in the user interface shown in FIG. 8, thus allowing a viewer to confirm that the video does not offer a video download reward.

9. Video Downloading/Saving

Figure 11:
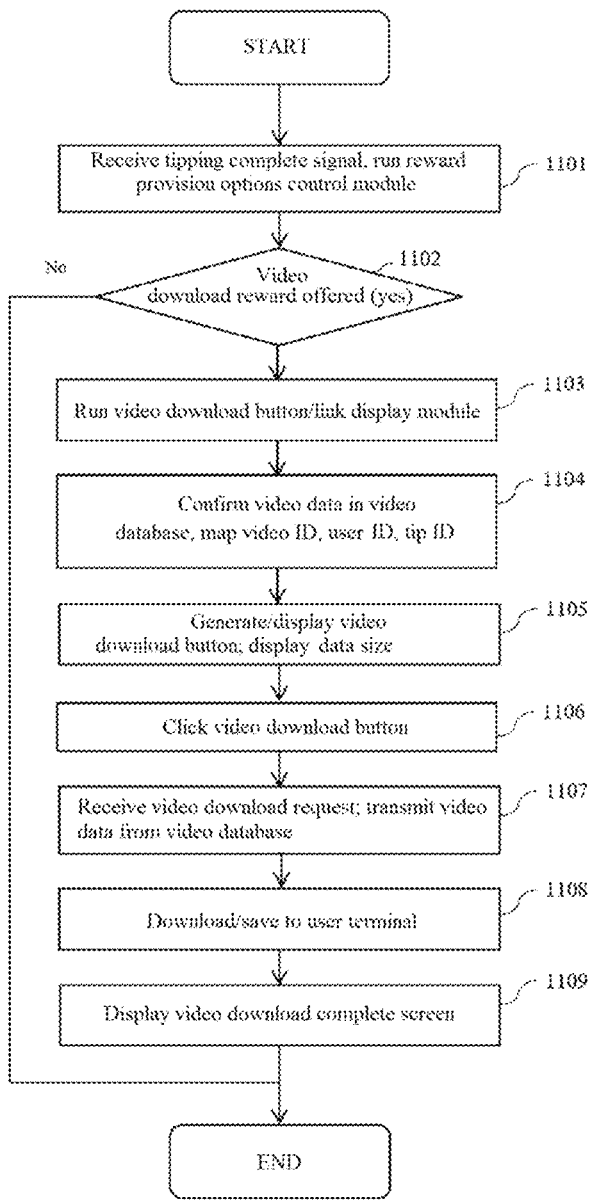
FIG. 11 is a flowchart of a reward download process of the same.

FIG. 11 is a flowchart of a process of downloading and saving a video download reward after a tip has been given.

Figure 10:
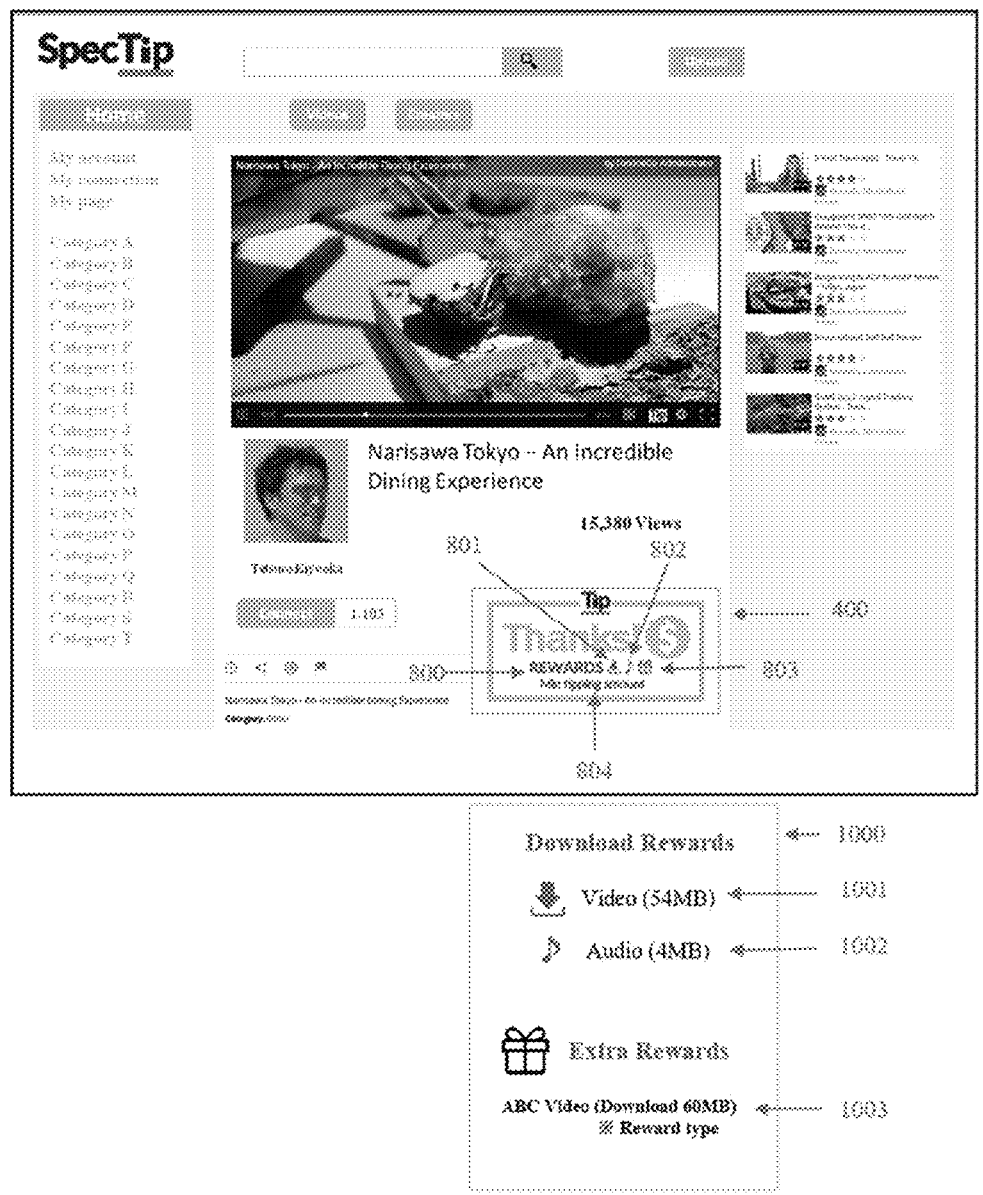
FIG. 10 is a schematic illustration of a video playback interface of the same.

When a viewer has finished giving a tip using the tipping button 400, in which the reward indicator (REWARDS) 800 and video download reward indicator 801 are displayed in FIG. 10, the reward provision options control module 125 receives a tipping complete signal from the tip processing module 201 and runs (step 1101), and confirms the Yes settings for the tip acceptance option 902 and the video download reward option 904 options in 900 (step 1102).

If the video download reward option 904 is set to Yes, the reward provision options control module 125 sends a request signal to the video download button/link display module 202 (step 1103), the video download button/link display module 202 confirms the video data in the video database 130, maps the video ID, user ID 160, and tipping ID (step 1104), generates a video download button 1001, displays the downloadable file size, and displays the video download button 1001 on a reward provision user interface 1000 (FIG. 10) (STEP 1105).

When the viewer clicks the video download button 1001 (step 1106), the video download button/link display module 202 receives a download request signal, extracts the indicated video file from the video database 130 and transmits the file to the viewer (step 1107), and the viewer saves the downloaded video on the terminal 141 (step 1108). When the video has finished downloading, a video download complete screen is displayed (step 1109).

In step 1102, if the video download reward option 904 has been set to No and the setting has been saved, a tipping button 400 for the video is generated and displayed on the user interface, the reward provision options control module 125 detects that the tip acceptance option 902 has been set to Yes and the video download reward option 904 to No in the options settings in 900 and performs control, and the reward indicator (REWARDS) 800 and video download reward indicator 801 are not displayed on the tipping button 400 for the video, thus allowing the viewer to confirm that a video download reward is not offered for the video.

In this case, even if the viewer gives a tip using the tipping button 400 of the video, the reward provision options control module 125, having received the tipping complete signal from the tip processing module 201, detects that the tip acceptance option 902 has been set to Yes and the video download reward option 904 to No and performs control (step 1102), the video download button/link display module 202 does not run, the video download button 1001 is not generated, and the video cannot be downloaded to and saved on the viewer's terminal 141.

After uploading a video, the content provider can log into the user account page (not shown) from the content provider terminal 140 and click a Manage Videos button (not shown) to access a user interface 1500, and access the user interface 900 for each video in 1501 to confirm and alter the settings for the tip acceptance option 902, tip count display option 903, video download reward option 904, video audio download reward option 905, ad revenue option 906, extra reward option 907, and reward minimum tip amount option 916.

10. Video Audio Download Rewards

The present embodiment is provided with a video audio download reward function, allowing the content provider to select and designate Yes or No for the video audio download reward option 905 in the user interface 900. As described above, only when the content provider has set the tip acceptance option 902 to Yes, the reward provision options control module 125 displays an active video audio download reward option 905, allowing a selection to be made and set, and the ad revenue option 906 is forcibly set to No and rendered inactive so that it cannot be selected.

If the tip acceptance option 902 is set to No, the reward provision options control module 125 forcibly sets the video audio download reward option 905 to No and renders it inactive so that it cannot be selected, and the ad revenue option 906 is set to Yes.

The setting and operation of the video audio download reward option 905 will now be described in greater detail with reference to the flowchart in FIG. 7.

As described in the previous section, the content provider clicks on the video "Upload" button 401 (step 701) on the content provider's terminal 140 and logs in, and the user ID 160 is identified (step 702). When the content provider sets the video audio download reward option 905 to Yes (step 707), the system waits for the content provider's option selections (step 708), the Submit Now button 918 is pressed (step 709), and the settings are saved (step 710); the reward provision options control module 125, which controls these options, runs, detects that the tip acceptance option 902 and the video audio download reward option 905 have been set to Yes, and conveys this information to the video audio module 203.

The video audio module 203 extracts the audio data from the video data stored in the video database 130; creates a file by converting (encoding, transcoding) and compressing the data to an optimal audio file format, such as MP3, FLAC, Vorbis, WAV, AAC, or the like; and assigns a video audio ID (identifier) to the file, maps the file with the video ID and the user ID 160, stores the file along with options settings in the video audio database 132, and updates and saves the user database 131.

The video audio module 203 then sends, to the reward provision options control module 125, a signal indicating that the video audio has finishing being converted to a file, the reward provision options control module 125 conveys this information to the tipping button/link display module 200, a tipping button 400 for the video is generated on the user interface (FIG. 8), and a reward indicator (REWARDS) 800 and video audio download reward indicator 802 are displayed.

This enables the viewer to confirm, before giving a tip, that a video audio download reward is offered for the video.

When the video audio download reward option 905 is set to No, and this setting has been saved (step 710), the reward provision options control module 125 detects this fact and performs control so that the reward indicator (REWARDS) 800 and video audio download reward indicator 802 are not displayed in the tipping button 400 for the video in the user interface shown in FIG. 8, thus allowing a viewer to confirm that the video does not offer a video audio download reward.

11. Video Audio Downloading/Saving

Figure 12:
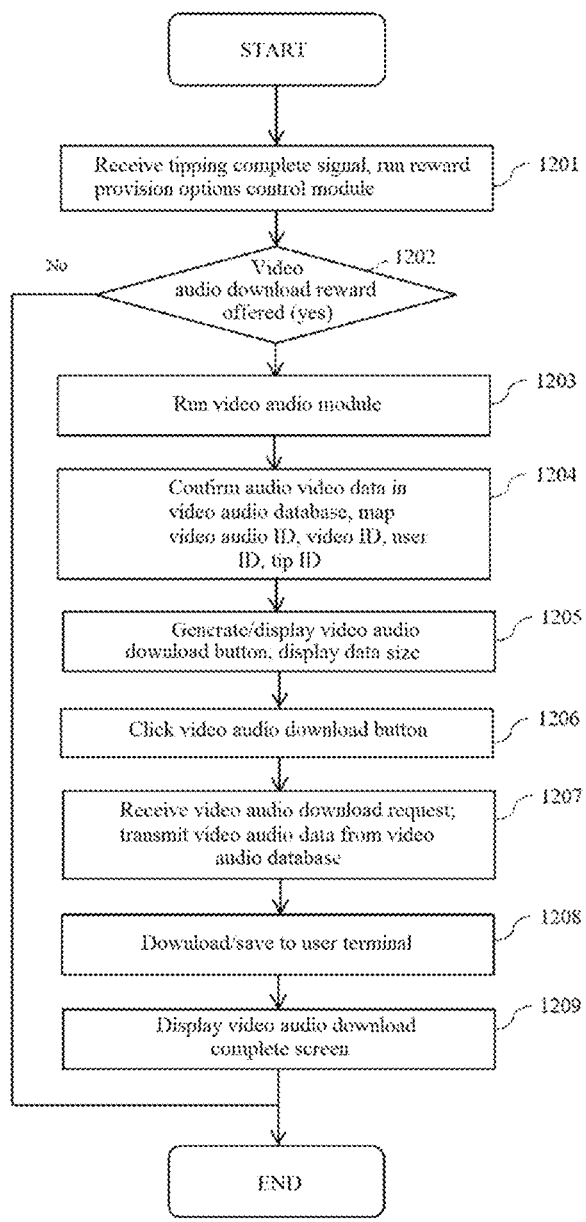
FIG. 12 is a flowchart of a reward download process of the same.

FIG. 12 is a flowchart of a process of downloading and saving a video audio download reward after a tip has been given.

When a viewer has finished giving a tip using the tipping button 400, in which the reward indicator (REWARDS) 800 and video audio download reward indicator 802 are displayed in FIG. 10, the reward provision options control module 125 receives a tipping complete signal from the tip processing module 201 and runs (step 1201), and confirms the Yes settings for the tip acceptance option 902 and the video audio download reward option 905 options in 900 (step 1202).

If the video audio download reward option 905 is set to Yes, the reward provision options control module 125 sends a request signal to the video audio module 203 (step 1203), the video audio module 203 confirms the video data in the video audio database 132, maps the video audio ID, video ID, user ID 160, and tipping ID (step 1204), generates a video audio download button 1002, displays the downloadable file size, and displays the video audio download button 1002 on the reward provision user interface 1000 (STEP 1205).

Then, when the viewer clicks the video audio download button 1002 (step 1206), the video audio module 203 extracts the indicated video audio file from the video audio database 132 and transmits the file to the viewer terminal 141 (step 1207), and the viewer downloads and saves the video audio for the video to the terminal 141 (step 1208).

When the video audio has finished downloading, a video audio download complete screen is displayed (step 1209).

In step 1202, if the video audio download reward option 905 has been set to No and the setting has been saved, a tipping button 400 for the video is generated and displayed on the user interface (FIG. 10), the reward provision options control module 125 detects that the tip acceptance option 902 has been set to Yes and the video audio download reward option 905 to No in the options settings in 900 and performs control, and the reward indicator (REWARDS) 800 and video audio download reward indicator 802 are not displayed on the tipping button 400 for the video, thus allowing the viewer to confirm that a video audio download reward is not offered for the video.

In this case, even if the viewer gives a tip using the tipping button 400 of the video, the reward provision options control module 125 detects that the tip acceptance option 902 has been set to Yes and the video audio download reward option 905 to No and performs control (step 1202), the video audio module 203 does not run, the video audio download button 1002 is not generated, and the video audio cannot be downloaded to and saved on the viewer's terminal 141.

After uploading a video from the terminal 140, the content provider can log into the user account page (not shown) from the content provider terminal 140 and click a Manage Videos button (not shown) to access a user interface 1500, and access the user interface 900 for each video in 1501 to confirm and alter the settings for the tip acceptance option 902, tip count display option 903, video download reward option 904, video audio download reward option 905, ad revenue option 906, extra reward option 907, and reward minimum tip amount option 916.

12. Extra Rewards

The system according to the present embodiment is provided with an extra rewards function, and the content provider can select and designate Yes or No for the extra reward option 907 in the interface 900 displayed on the terminal 140.

As described above, only when the content provider has set the tip acceptance option 902 to Yes, the reward provision options control module 125 displays an active extra reward option 907, allowing a selection to be made and set, and the ad revenue option 906 is forcibly set to No and rendered inactive so that it cannot be selected.

If the tip acceptance option 902 is set to No, the reward provision options control module 125 forcibly sets the extra reward option 907 to No and renders it inactive so that it cannot be selected, and the ad revenue option 906 is set to Yes. The setting and operation of the extra reward option 907 will now be described in greater detail with reference to the flowchart in FIG. 7.

As described above, the content provider clicks on the video "Upload" button 401 (step 701) and logs in, and the user ID 160 is identified (step 702). If the content provider sets the extra reward option 907 to Yes, an active reward type selection 908 is displayed, and the content provider selects and designates the reward type.

If the content provider selects and designates a download reward type 909 or an in-site page display reward type 910 in the reward type selection 908, an active user interface 912 is displayed (FIG. 9), and the content provider designates the reward data in the user interface 912, and uploads the data from the terminal 140.

Digital content items of various formats, including video, audio, images, and text files such as MPEG, MP4, MOV, MP3, FLAC, WAV, JPEG, PNG, GIF, and PDF files, can be uploaded. The content provider enters a reward name in 914, and a reward description in 915.

If the content provider has designated an external page link reward type 911, an active URL input box 913 (FIG. 9A) is displayed, and the content provider enters the URL of an external page through which the reward is offered. The content provider enters a reward name in 914, and a reward description in 915. Also, when the external page link reward type 911 is selected, the user interface 912 is not displayed, making it impossible to designate and upload data.

The content provider sets the extra reward option 907 to Yes and designates one of a download reward type 909, an in-site page display type 910, or an external page line reward type 911 (step 707), the system waits for the content provider's option selections (step 708), the Submit Now button 918 is pressed (step 709), and the settings are saved (step 710); the reward provision options control module 125, which controls these options, runs, detects that the tip acceptance option 902 and the extra reward option 907 have been set to Yes, and conveys this information to the extra reward module 204.

When a download reward type 909 is designated for the reward type selection 908, the extra reward module 204 creates a file by converting (encoding, transcoding) and compressing the extra reward data designated and uploaded using the user interface 912 to an optimal file format, and assigns an extra reward ID (identifier). The extra reward file and extra reward ID are mapped to the entered reward name 914, reward description 915, options settings, video ID, and user ID 160 and stored in the extra rewards database 135, and the user database 131 is updated and saved.

When an in-site page display reward type 910 is designated for the reward type selection 908, the extra reward module 204 creates a file by converting (encoding, transcoding) and compressing the extra reward data designated and uploaded using the user interface 912 to an optimal file format, assigns an extra reward ID (identifier) thereto, assigns an in-site page display URL for the video hosting website 100 at which the extra reward file is displayed, and generates an extra reward page on which the extra reward file is displayed. The extra reward file, extra reward page, in-site page display URL, and extra reward ID are mapped to the entered reward name 914, reward description 915, options settings, video ID, and user ID 160 and stored in the extra rewards database 135, and the user database 131 is updated and saved.

When an external page link reward type 911 is selected for the reward type selection 908, the extra reward module 204 assigns an extra reward ID (identifier) to the URL entered in the URL input box 913. The external page link and extra reward ID are mapped to the entered reward name 914, reward description 915, options settings, video ID, and user ID 160 and stored in the extra rewards database 135, and the user database 131 is updated and saved.

The extra reward module 204 then sends, to the reward provision options control module 125, a signal indicating that the extra reward has finished processing, the reward provision options control module 125 receives the signal and conveys this information to the tipping button/link display module 200, a tipping button 400 for the video is generated on the user interface (FIG. 8), and a reward indicator (REWARDS) 800 and extra reward indicator 803 are displayed, thereby allowing a viewer to confirm, before tipping, that the video comes with an extra reward.

When the extra reward option 907 is set to No, and this setting has been saved (step 710), the reward provision options control module 125 detects this fact and performs control so that the reward indicator (REWARDS) 800 and extra reward indicator 803 are not displayed in the tipping button 400 for the video in the user interface shown in FIG. 8, thus allowing a viewer to confirm that the video does not offer an extra reward.

Multiple extra rewards can be offered. To add an extra reward, an add extra reward button 919 is clicked to display an additional extra reward interface 920 on the user interface 900 (FIG. 9B), thus allowing Yes or No to be selected and designated for the extra reward option 907 as described above. The method of setting and the operation of additional extra rewards are the same as in the case of the method of setting extra rewards described above.

13. Receiving Extra Rewards

Figure 13:
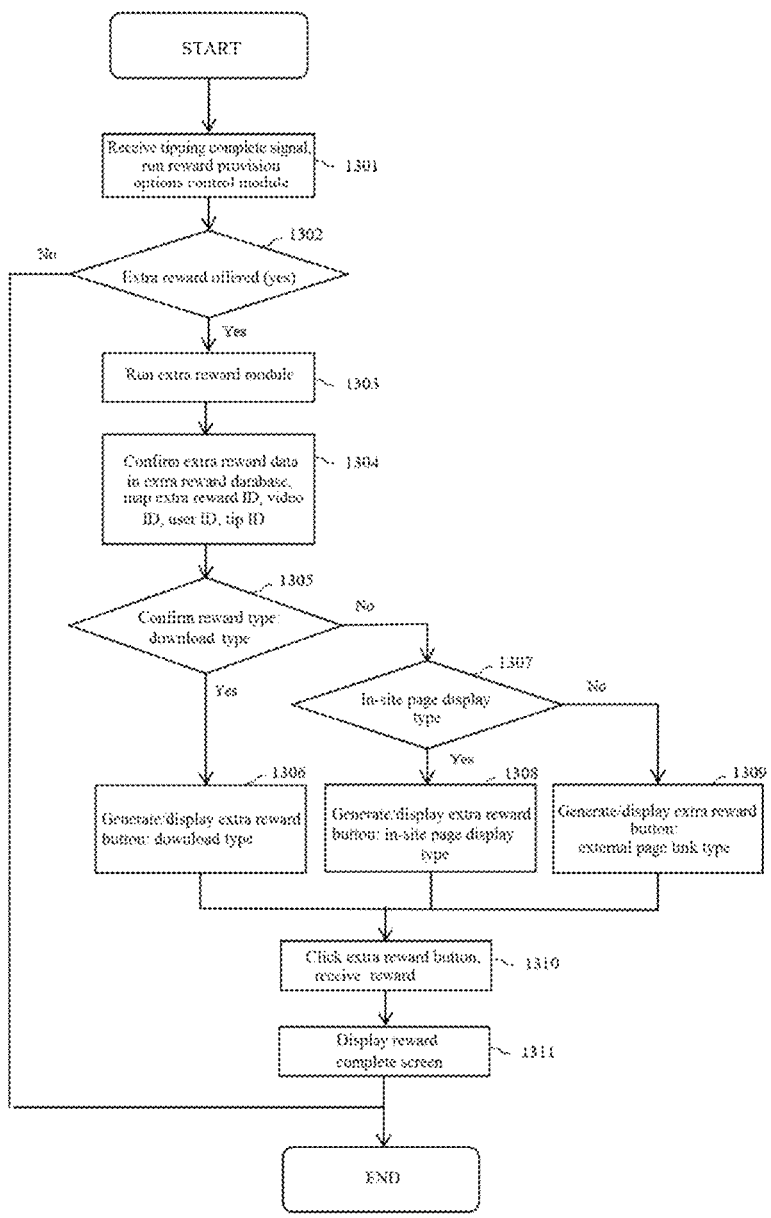
FIG. 13 is a flowchart of a reward offering process of the same.

FIG. 13 is a flowchart of a process of receiving an extra reward after a tip has been given.

When a viewer has finished giving a tip using the tipping button 400, in which the reward indicator (REWARDS) 800 and extra reward indicator 803 are displayed (FIG. 10), the reward provision options control module 125 receives a tipping complete signal from the tip processing module 201 and runs (step 1301), and confirms the Yes settings for the tip acceptance option 902 and the extra reward option 907 options in 900 (step 1302), and sends a request to the extra reward module 204 (step 1303); and the extra reward module 204 confirms the extra reward data with the extra rewards database 135, maps the data to the extra reward ID, video ID, user ID 160, and tip ID (step 1304), and confirms the reward type designated in the reward type selection 908 (step 1305).

If the download reward type 909 is designated in the reward type selection 908 (step 1306), the extra reward module 204 generates an extra reward provision button 1003 (FIG. 10), and displays the extra reward provision button 1003 on the reward provision user interface 1000 along with the name of the extra reward, the form of the reward (in this case, a download), and the file size (step 1306).

When a viewer clicks the extra reward provision button 1003 (in this case, a download) (step 1310), the extra reward module 204 receives a request signal, extracts the indicated extra reward file from the extra rewards database 135, and transmits the file to the viewer terminal 141, and the viewer downloads and saves the extra reward on the terminal (step 1310). When the extra reward has finished downloading, an extra reward complete screen is displayed (step 1311).

If the in-site page display reward type 910 is designated in the reward type selection 908 (steps 1307, 1308), the extra reward module 204 embeds the assigned in-site page display URL in the extra reward provision button 1003 (FIG. 10), and displays the extra reward provision button 1003 on the reward provision user interface 1000 along with the name of the extra reward and the form of the reward (in this case, an in-site page display) (step 1308).

When the viewer clicks the extra reward provision button 1003 (step 1310), the assigned in-site page display URL page is linked to, the extra reward file is displayed on the in-site page (not shown), and the viewer receives the reward (step 1310). When the in-site extra reward page has finished displaying, an extra reward complete screen is displayed (step 1311).

If the external page link reward type 911 is designated in the reward type selection 908 (step 1309), the extra reward module 204 embeds the URL entered into the external page link URL input box 913 in the extra reward provision button 1003 (FIG. 10), and displays the extra reward provision button 1003 on the reward provision user interface 1000 along with the name of the extra reward and the form of the reward (in this case, an external page link) (step 1309).

When the viewer clicks the extra reward provision button 1003 (step 1310), an external page indicated by the URL entered into the URL input box 913 is linked to, the page is displayed, and the viewer who gave the tip receives the reward on the displayed external page (not shown). When the extra reward external page has finished displaying, an extra reward complete screen is displayed (step 1311).

In step 1302, if the extra reward option 907 has been set to No and the setting has been saved (step 1302), a tipping button 400 for the video is generated on the user interface in FIG. 10, the reward provision options control module 125 detects that the extra reward option 907 for the video has been set to No and performs control, and the reward indicator (REWARDS) 800 and extra reward indicator 803 are not displayed on the tipping button 400, thus allowing the viewer to confirm that an extra reward is not offered for the video.

In this case, even if the viewer gives a tip for the video using the tipping button 400, the reward provision options control module 125 detects that the extra reward option 907 has been set to No and performs control, the extra reward module 204 does not run, and an extra reward provision button 1003 is not generated, making it impossible to receive an extra reward for the video.

After uploading a video, the content provider can log into the user account page (not shown) from the content provider terminal 140 and click a Manage Videos button (not shown) to access a user interface 1500, and access the interface 900 for each video in 1501 to confirm and alter the settings for the tip acceptance option 902, tip count display option 903, video download reward option 904, video audio download reward option 905, ad revenue option 906, extra reward option 907, and reward minimum tip amount option 916.

14. Reward Minimum Tip Amount

The present embodiment is provided with a function for setting a reward minimum tip amount to receive rewards, allowing the content provider to select and designate Yes or No for the reward minimum tip amount option 916 in the user interface 900. As described above, only when the content provider has set the tip acceptance option 902 to Yes, the reward provision options control module 125 displays an active reward minimum tip amount option 916, allowing a selection to be made and set, and the ad revenue option 906 is forcibly set to No and rendered inactive so that it cannot be selected.

If the tip acceptance option 902 is set to No, the reward provision options control module 125 forcibly sets the reward minimum tip amount option 916 to No and renders it inactive so that it cannot be selected, and the ad revenue option 906 is set to Yes.

If the reward minimum tip amount option 916 is set to Yes, an active minimum tip currency selection/amount input box 917 is displayed, allowing a currency to be selected and an amount set for the minimum tip amount to receive a reward.

The minimum tip amount to receive a reward is a minimum tip amount to receive rewards (premiums) set by the content provider for tips given by viewers after watching a video; therefore, the user interface 900 and the reward minimum tip amount option 916 are designed so that one minimum tip amount can be set per video, and this is controlled by the reward provision options control module 125.

The reward minimum tip amount option 916, video download reward option 904, video audio download reward option 905, and extra reward option 907 work together, and, only when Yes has been set for the option to offer two or more (a plurality) of these rewards, an active reward minimum tip amount option 916 is displayed, allowing the user to make and set a selection.

Because a user can opt to offer two or more (multiple) rewards in the extra reward option 907, an active reward minimum tip amount option 916 is also displayed if two or more extra rewards only are offered, allowing the minimum amount to be selected and set.

If the user opts to offer (Yes) only one of these rewards, an active reward minimum tip amount option 916 is not displayed, making it impossible to select and set this option. The setting and operation of the reward minimum tip amount option 916 will now be described in greater detail with reference to the flowchart in FIG. 7.

As described in the previous section, the content provider clicks on the video "Upload" button 401 (step 701) and logs in, and the user ID 160 is identified (step 702). Next, the user interface 900 is displayed (step 703), it is confirmed that the tip acceptance option 902 is set to Yes (steps 704, 705), after which it confirmed that Yes has been set for two or more (a plurality of) the video download reward option 904, the video audio download reward option 905, and the extra reward option 907, an active reward minimum tip amount option 916 is displayed, it is confirmed that Yes has been set, and an active minimum tip currency selection/amount input box 917 is displayed.

The content provider then inputs a minimum tip amount (currency and amount) to receive rewards into the minimum tip currency selection/amount input box 917 (step 707). The system waits for the content provider's option selections (step 708), and, when the Submit Now button has been pressed (step 709) and the settings saved (step 710), the reward provision options control module 125, which controls the options, runs, confirms that Yes has been set for the tip acceptance option 902 two or more (a plurality) of the video download reward option 904, the video audio download reward option 905, and the extra reward option 907 (for which multiple rewards can be offered), confirms that Yes has been set for the reward minimum tip amount option 916, and detects and confirms the reward minimum tip amount entered in the minimum tip currency selection/amount input box 917, and conveys this information to the reward minimum tip amount module 205. The reward minimum tip amount module 205 assigns a reward minimum tip amount ID (identifier) to the set reward minimum tip amount, maps the same to the video ID and the user ID 160, stores the same in the reward minimum tip amount database 136 along with the set reward minimum tip amount and options settings, and updates and saves the user database 131 (step 710).

Next, the reward minimum tip amount module 205 sends a reward minimum tip amount process complete signal to the reward provision options control module 125, which receives the signal and conveys this information to the tipping button/link display module 200, and a tipping button 400 for the video is generated on the user interface (FIG. 8), and the reward indicator (REWARDS) 800 and a reward minimum tip amount indicator 804 are displayed. This enables the viewer to confirm, before giving a tip, that a reward minimum tip amount has been set for the video.

When the viewer hovers (without clicking) a mouse pointer 805 over the tipping button 400 on which the reward minimum tip amount indicator 804 is displayed (FIG. A), a reward details interface 806 and reward minimum tip amount details 810 (in this example, USD 2.00 or more) are displayed, allowing the viewer to confirm the reward minimum tip amount. Similarly, when the lower part of the tipping button 400 on the touchscreen browser 170 is touched (FIG. 8B), the reward details interface 806 and reward minimum tip amount details 810 (in this example, USD 2.00 or more) are displayed, allowing the reward minimum tip amount to be confirmed.

When the reward minimum tip amount option 916 has been set to No, and this setting has been saved (step 710), the reward minimum tip amount indicator 804 is not displayed on the tipping button 400 for the video in the user interface in FIG. 8, thus allowing the viewer to confirm that a reward minimum tip amount has not been set for the video.

15. Control Based on Reward Minimum Tip Amount Setting

Figure 14:
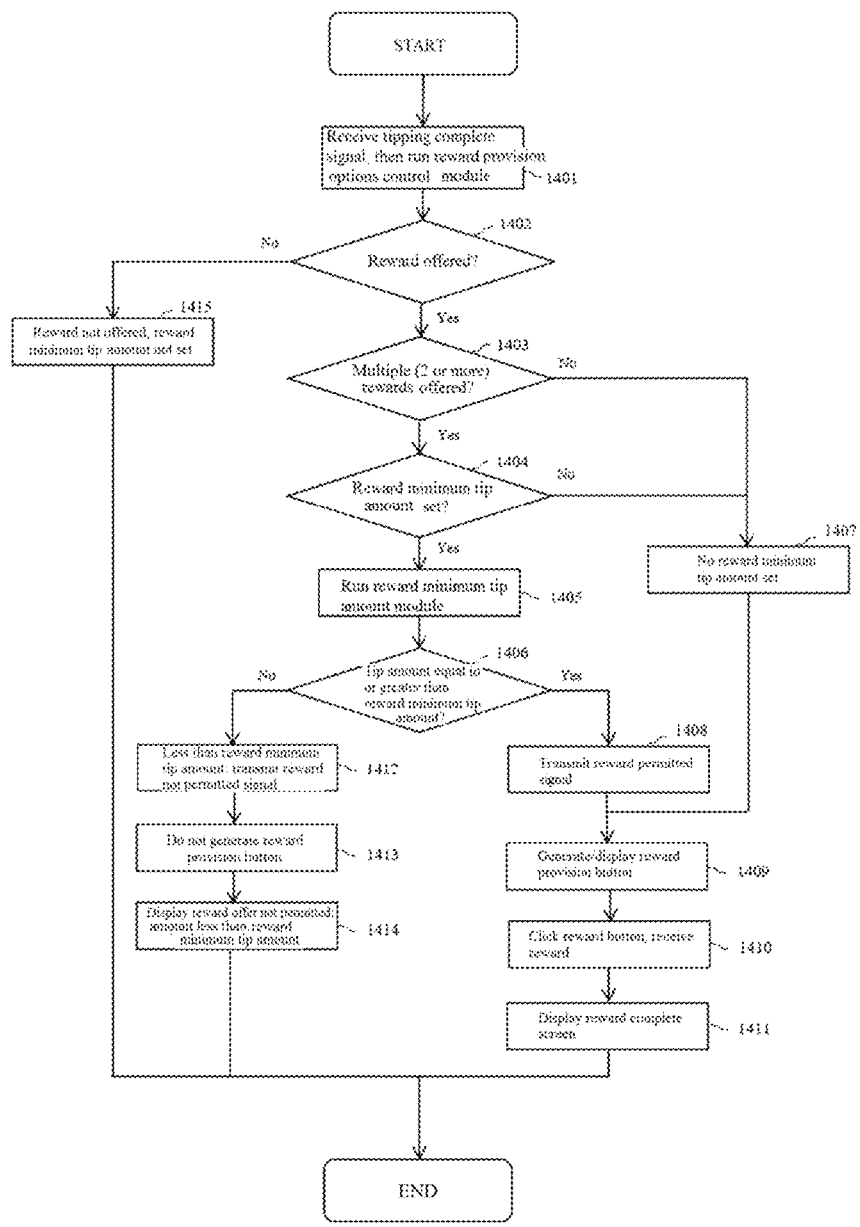
FIG. 14 is a flowchart of a reward minimum tip amount process of the same.
Figure 15:
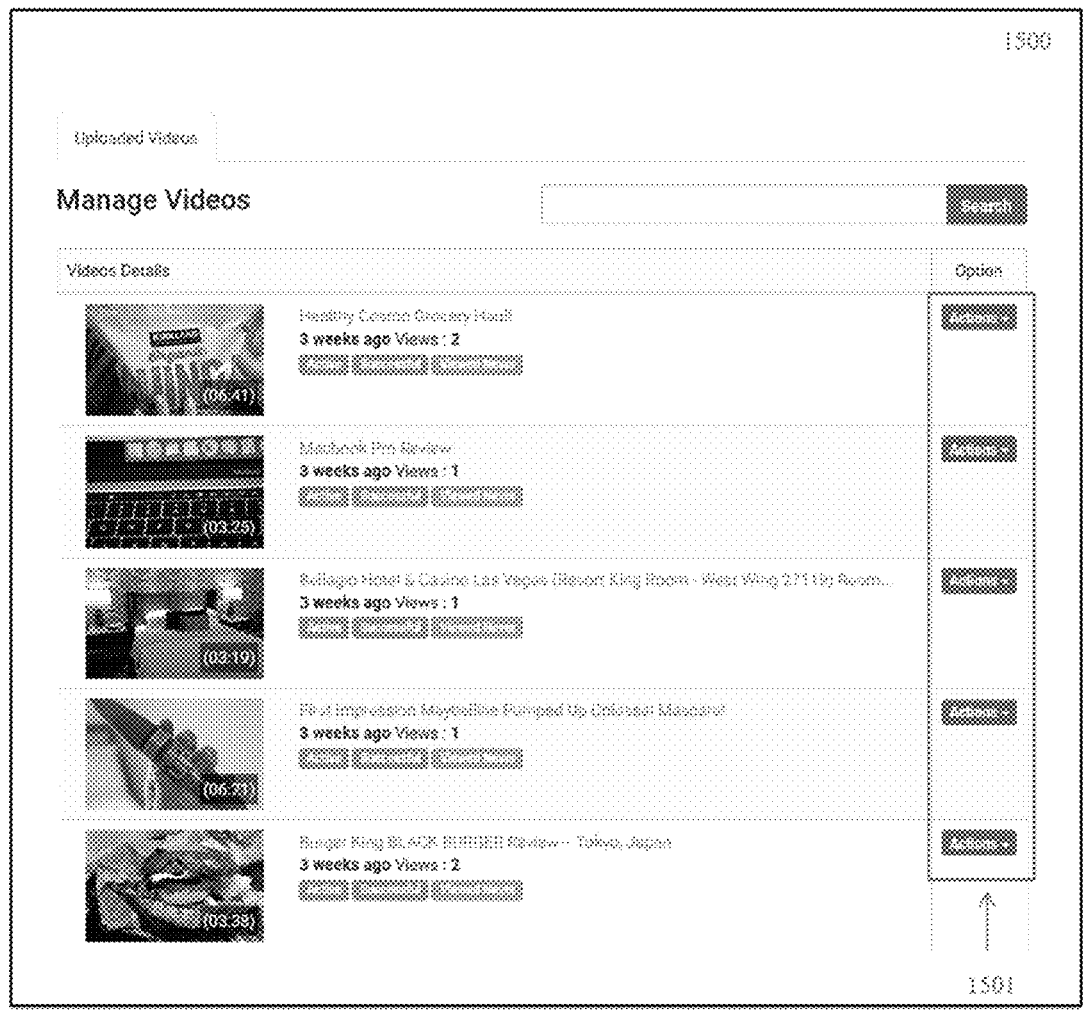
FIG. 15 is a schematic illustration of an uploaded video management screen of the same.

FIG. 14 is a flowchart of a reward receipt control process based on the reward minimum tip amount setting after a tip has been given.

Once the viewer has finished giving a tip using the tipping button 400 on which the reward indicator (REWARDS) 800, any of the video download reward indicator 801, video audio download reward indicator 802, and extra reward indicator 803, and the reward minimum tip amount indicator 804 are displayed (FIG. 10), the reward provision options control module 125 receives the tipping complete signal from the tip processing module 201 and runs (step 1401), the enabling of the tip acceptance option 902 (Yes) and the reward settings for the video download reward option 904, video audio download reward option 905, and extra reward option 907 in the options settings in 900 are confirmed (step 1402), and, if Yes is set for any of these, it is confirmed whether Yes is set for two or more (a plurality) of these options (step 1403).

Because a user can opt to offer two or more (multiple) rewards in the extra reward option 907, an active reward minimum tip amount option 916 is also displayed if two or more extra rewards only are offered, allowing the minimum amount to be selected and set.

If two or more (a plurality) these rewards have been designated, it is confirmed that Yes is set forth the reward minimum tip amount option 916 (step 1404), the reward provision options control module 125 conveys this information to the reward minimum tip amount module 205 and runs (step 1405), and the reward minimum tip currency and amount entered in the minimum tip currency selection/amount input box 917 are confirmed (step 1406).

For example, assume that "USD 2.00" has been set for the reward minimum tip amount in the minimum tip currency selection/amount input box 917. In this case, if a view gives a tip of "USD 2.00" or more using the tipping button on which the reward minimum tip amount indicator 804 is displayed, the reward minimum tip amount module 205 confirms the reward minimum tip amount ID, video ID, and user ID 160 mapped to the reward minimum tip amount database 136 and the set reward minimum tip amount (in this example, USD 2.00), and sends a reward permitted signal to the reward provision options control module 125 (step 1408).

As described above, the video download button/link display module 202, video audio module 203, and extra reward module 204 run according to their respective settings on the basis of the settings for the video download reward option 904, video audio download reward option 905, and extra reward option 907 in the options settings in 900, and the reward provision options control module 125 generates the video download button 1001, video audio download button 1002, and extra reward provision button 1003 according to their respective settings, likewise on the basis of the options settings in 900, the buttons are displayed on the reward provision user interface 1000 on the basis of these options settings (step 1409), and the viewer clicks on the buttons to receive the rewards (step 1410). When the various rewards have been completely received, a completion screen is displayed as described above (step 1411).

In steps 1409, 1410, and 1411, the operation of downloading and saving the video, downloading and saving the video audio, and receiving the extra reward are as described in the previous section.

In step 1403, if the option to offer only one reward out of the video download reward option 904, video audio download reward option 905, and extra reward option 907 has been set and saved, the reward provision options control module 125 detects this fact and performs control, an active reward minimum tip amount option 916 is not displayed, making it impossible to select and set the same, and the reward minimum tip amount module 205 does not run, making it impossible to set a reward minimum tip amount to receive the reward (step 1407).

In step 1404, if the reward minimum tip amount option 916 is set to No and the setting has been saved, the reward provision options control module 125 detects this fact and performs control, the reward minimum tip amount module 205 does not run, and a reward minimum tip amount to receive a reward cannot be set (step 1407).

In step 1406, the reward minimum tip amount module 205 confirms the tip amount paid by the viewer and the reward minimum tip amount entered in the minimum tip currency selection/amount input box 917 and set by the content provider, and the process proceeds to step 1412 if the set reward minimum tip amount is not met. For example, assume that "USD 2.00" has been set for the reward minimum tip amount in the minimum tip currency selection/amount input box 917. If a view gives a tip of "less than USD 2.00" using the tipping button on which the reward minimum tip amount indicator 804 is displayed, the reward minimum tip amount module 205 confirms the reward minimum tip amount ID, video ID, and user ID 160 mapped to the reward minimum tip amount database 136 and the reward minimum tip amount (in this example, USD 2.00), and sends a less than reward minimum tip amount/reward not permitted signal to the reward provision options control module 125 (step 1412).

Having received the less than reward minimum tip amount/reward not permitted signal, the reward provision options control module 125, on the basis of the settings for the video download reward option 904, video audio download reward option 905, and extra reward option 907 in the options settings in 900, controls the video download button/link display module 202, video audio module 203, and extra reward module 204 so that the modules do not run, and do not generate the video download button 1001, video audio download button 1002, and extra reward provision button 1003, the buttons are not displayed on the reward provision user interface 1000, and the viewer is incapable of receiving rewards for the video (1413). Simultaneously, the reward minimum tip amount module 205 displays a reward not available indicator (due to not meet the reward minimum tip amount) (1414), allowing the viewer to confirm that the tip given was less than the reward minimum tip amount, and a reward cannot be received.

In step 1402, if No is designated for all of the video download reward option 904, the video audio download reward option 905, and extra reward option 907, and those settings have been saved, no reward is offered, and the reward minimum tip amount option 916 does not become active and cannot be set (step 1415).

After uploading a video, the content provider can log into the user account page (not shown) from the content provider terminal 140 and click a Manage Videos button (not shown) to access a user interface 1500, and access the interface 900 for each video in 1501 to confirm and alter the settings for the tip acceptance option 902, tip count display option 903, video download reward option 904, video audio download reward option 905, ad revenue option 906, extra reward option 907, and reward minimum tip amount option 916.

16. Reward Definitions and Reward Minimum Tip Amounts

As described above, the reward minimum tip amount is the minimum tip amount set by the content provider at which rewards (premiums) are offered for tips given by viewers after viewing a video, and thus, as a rule, is set for each individual video. Therefore, the user interface 900 and the reward minimum tip amount option 916 are designed so that only one reward minimum tip amount is set per video, making it impossible to set multiple reward minimum tip amounts for a single video even if the content provider is offering multiple rewards.

The reward minimum tip amount option 916, video download reward option 904, video audio download reward option 905, and extra reward option 907 work together, and, only when Yes has been set for the option to offer two or more (a plurality) of these rewards, an active reward minimum tip amount option 916 is displayed, allowing the user to make and set a selection. However, if only one of these rewards is set to Yes, the reward minimum tip amount option 916 is forcibly set to No and becomes inactive, making it impossible to set individual reward minimum tip amounts for each reward; the reward provision options control module 125 controls this process.

The reason for this is that, if it were possible to set individual reward minimum tip amounts for each of video download rewards, video audio download rewards, and extra rewards, it would logically be possible to specify separate minimum tip amounts. If it were possible to specify separate amounts for the various reward minimum tip amounts, the video download rewards, video audio download rewards, and extra rewards offered as rewards (premiums) would become a business model akin to merchandise with attached minimum amounts, weakening their significance as rewards (premiums). In order to avoid specifying separate reward minimum tip amounts in this way, the reward minimum tip amount can only be set when two or more (a plurality) of the rewards are offered. This is because, if a plurality of rewards is offered, it will be impossible to specify separate amounts for the various reward minimum tip amounts, since only one reward minimum tip amount can be set per video. This makes it clear that the video download rewards, video audio download rewards, and extra rewards offered as rewards are rewards (premiums) rather than merchandise. This is because it must logically be impossible to specify a price for a reward (premium), unlike products or merchandise for sale.

In addition to the matters discussed above, the definition of a reward (premium) is that it is possible, depending on the options settings set by the content provider, to decline to offer a video download reward, video audio download reward, or extra reward even if a viewer gives a tip using the tipping button 400. By virtue of this function, the video download rewards, video audio download rewards, and extra rewards can be defined as rewards (premiums) rather than products or services for sale.

However, if the content provider limits the offer to a single reward (premium), it becomes logically possible to associate the viewer tip amount with a single reward, making it possible to specify the reward amount, and resulting in a business model close to merchandise. If two or more (a plurality of) rewards (premiums) are offered, the amount tipped by the viewer cannot be associated with individual rewards (premiums), and individual reward amounts cannot be specified, making it possible to define video download rewards, video audio download rewards, and extra rewards as rewards (premiums).

As a result, not only is it naturally more clearly apparent to the viewer receiving the rewards in return for tips that the video download rewards, video audio download rewards, and extra rewards are rewards (premiums), but also the content provider offering the rewards, having the ability to set multiple rewards when posting videos, is capable of recognizing and understanding that these are rewards (premiums), and the user interface 900 allows granular setting, on an individual video basis, of the option to offer or not offer rewards.

The present invention allows a content provider to offer two or more (a plurality of) rewards (premiums) per video, making it possible to more clearly define the services offered as rewards (premiums) as rewards (premiums), and for the content provider and the viewer to logically recognize and understand that the services offered and received as a result of tipping are rewards (premiums).

In addition, the offering of two or more (a plurality of) rewards (premiums) for a single video by the content provider increases the viewer's motivation to tip, and the multiple rewards increases the viewer's satisfaction as well. There is thus provided an invention (function) whereby tipping rates can be increased, thus inevitably increasing both the tip revenue of the content provider and the revenue of the operator of the video hosting website 100, and making it possible to construct a win-win business model.

17. Tipping Button Details Display Function

While the main function of the tipping button 400 in the present invention is as a tipping button while a viewer is watching a video, the reward indicator (REWARDS) 800, video download reward indicator 801, video audio download reward indicator 802, extra reward indicator 803, and reward minimum tip amount indicator 804 are displayed on the tipping button 400 according to the options settings selected by the content provider, as discussed above, allowing the viewer to confirm an overview of rewards before tipping.

However, there is a risk of the viewer being overwhelmed if multiple items of detailed information (rewards details, reward minimum tip amount details) are displayed on the tipping button 400. In particular, if the currency and numerical amount for the reward minimum tip amount are displayed on the tipping button 400, the button ends up having the reward minimum tip amount displayed thereon, resulting in the risk of the viewer perceiving video download rewards, video audio download rewards, and extra rewards not as rewards (premiums), but as merchandise, potentially nullifying the invention-characterizing function and significance thereof as a display of rewards (premiums) offered when the viewer gives a tip while viewing the video.

In order to avoid this, the main function of the tipping button 400, viz., enabling a viewer to confirm reward details and reward minimum amounts before tipping without interfering with the viewer's ability to give a tip while viewing the video, is essential; therefore, the tipping button 400 is provided with the following function.

Figure 8A:
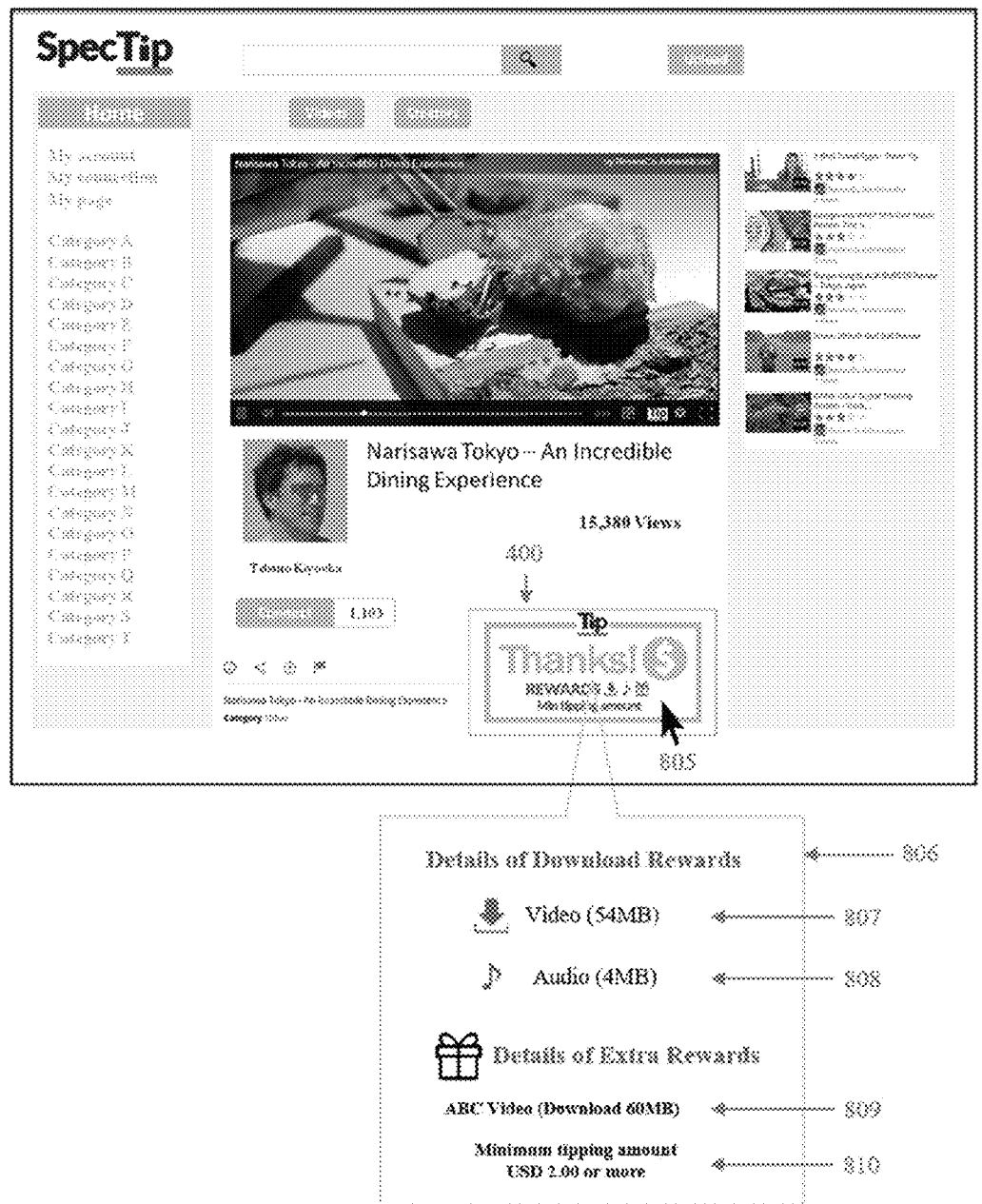
FIG. 8A is a schematic illustration of a video playback interface of the same.
Figure 8B:
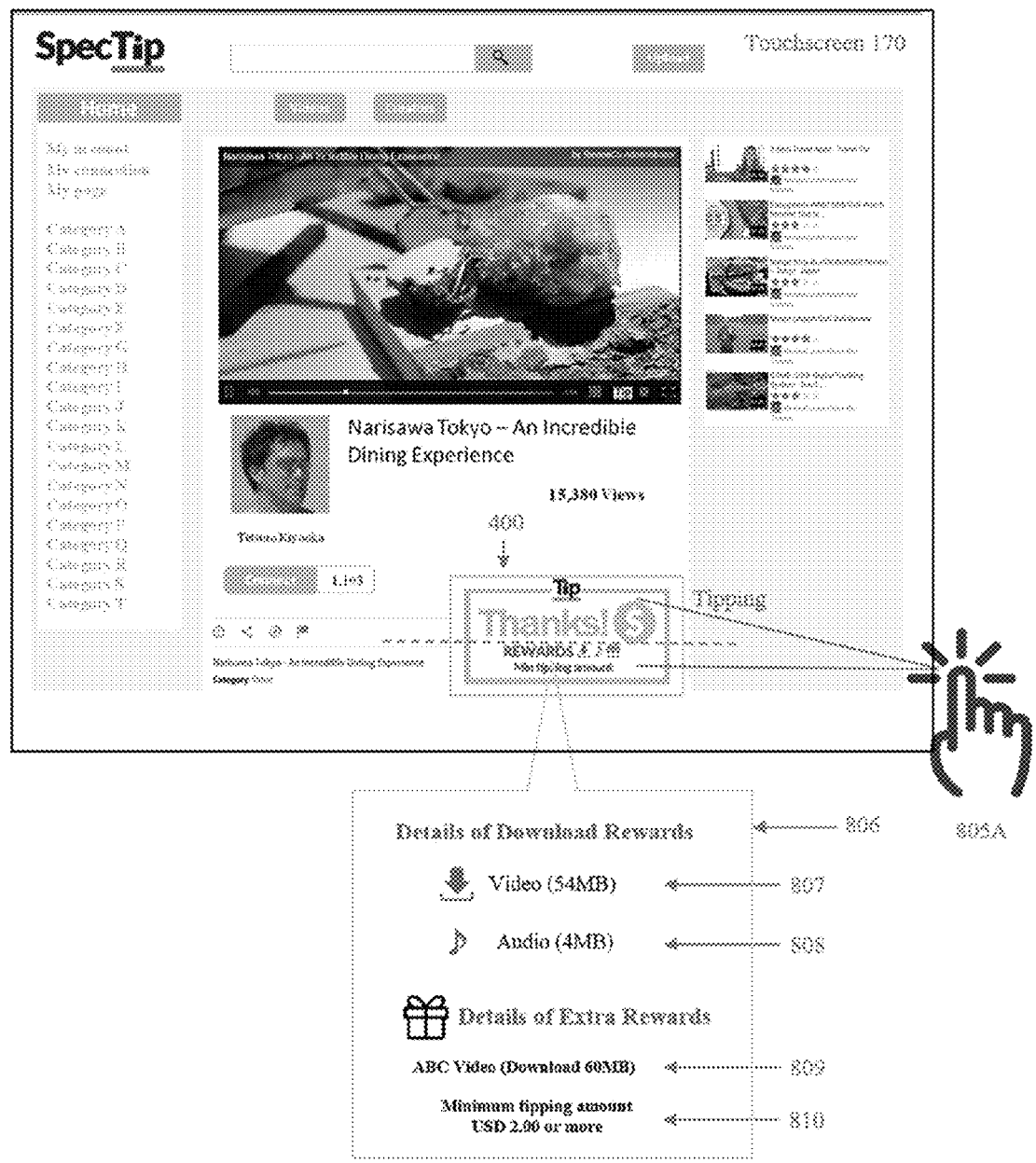
FIG. 8B is a schematic illustration of a video playback interface of the same.

In FIG. 8A, when any of the reward indicator (REWARDS) 800, video download reward indicator 801, video audio download reward indicator 802, extra reward indicator 803, and reward minimum tip amount indicator 804 is displayed on the tipping button 400, the viewer can hover 805 (without clicking) a mouse pointer (not shown) over the tipping button 400 to display a reward details interface 806; and video download reward details (file size indication) 807, video audio download reward details (file size indication) 808, extra rewards details (extra reward names and file size indication) 809, and reward minimum tip amount details (reward minimum tip amount currency and amount) 810 are displayed, allowing the viewer to confirm the details before tipping. The mouse pointer 805 in FIG. 8A is that of a browser 170 used in ordinary personal computers.

Ordinarily, however, a mouse pointer 805 is not displayed in touchscreen-type browsers 170 generally used on smartphones and tablets, and these devices are manipulated using the touchscreen. Therefore, in the case of a touchscreen-type browser 170 (FIG. 8B), when any of the reward indicator (REWARDS) 800, video download reward indicator 801, video audio download reward indicator 802, extra reward indicator 803, and reward minimum tip amount indicator 804 is displayed on the tipping button 400, the lower part of the tipping button 400 can be touched 805A to display the reward details interface 806, allowing the details thereof to be confirmed. In the case of this touchscreen-type browser 170, touching 805A the upper part of the tipping button 400 results in a tipping operation to be performed.

18. Reward User Interface Function and Display Examples

As described in the previous section, the display and functionality of the reward indicators on the tipping button 400, the rewards details display on the reward details user interface 806, and the display and functionality of the buttons on the reward provision user interface 1000 vary according to the options settings in the user interface 900; the reward provision options control module 125 controls these processes.

Therefore, the invention will be described in greater detail with reference to the settings examples shown in FIG. 16A-16F.

In the present embodiment, the tip acceptance option 902 and tip count display option 903 are set to Yes, the ad revenue option 906 is set to No, and the Submit Now button 918 is pressed to save and set all options.

In the example shown in FIG. 16A, the video download reward option 904, video audio download reward option 905, and extra reward option 907 are set to No, the reward type selection 908, which is subordinate to the extra reward option 907, becomes inactive, and all rewards in the reward minimum tip amount option 916 are disabled, forcibly set to no, and deactivated.

None of the reward indicators are shown on the tipping button 400, the reward details user interface 806 is also not shown, and the viewer is capable of not being offered any rewards for tips. In this case, the reward provision user interface 1000 is not shown, preventing any reward whatsoever from being received, even if the viewer clicks on the tipping button 400.

Figure 16B:
FIG. 16B is a schematic illustration of the relationship between the settings in a reward settings screen and the display of a tipping button.

In the example in FIG. 16B, the video download reward option 904 and video audio download reward option 905 are set to Yes, the extra reward option 907 is set to No and the accompanying reward type selection 908 becomes inactive, and two (a plurality of) rewards, a video download reward and a video audio download reward, are offered, and the reward minimum tip amount option 916 is active, but set to No.

In this case, the reward indicator (REWARDS) 800, video download reward indicator 801, and video audio download reward indicator 802 are displayed on the tipping button 400, and video download reward details (file size indication) 807 and video audio download reward details (file size indication) 808 are displayed in the reward details user interface 806. In this case, when the viewer gives a tip by clicking on the tipping button 400, the video download button (file size indication) 1001 and video audio download button (file size indication) 1002 are displayed in the reward provision user interface 1000. The viewer can receive the rewards by clicking on the video download button 1001 and video audio download button 1002.

Figure 16C:
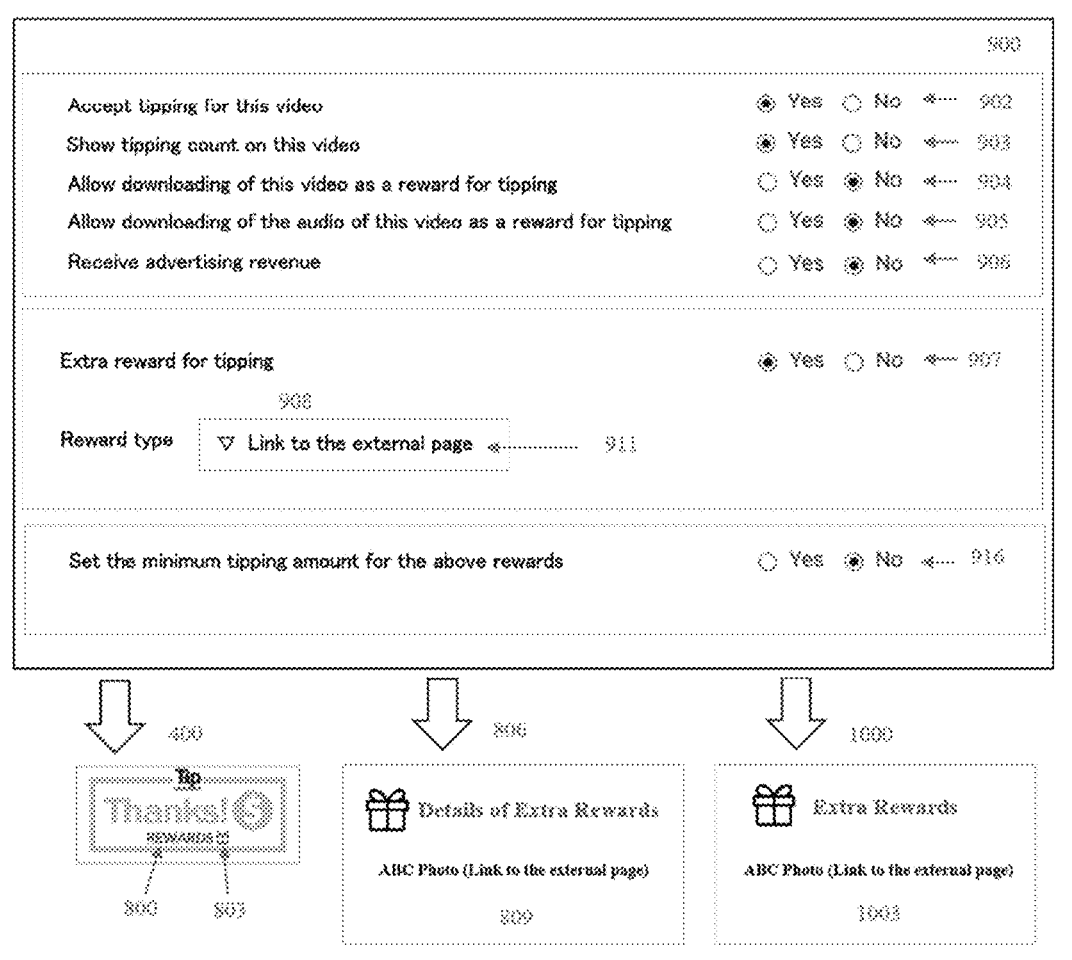

In the example in FIG. 16C, the video download reward option 904 is set to No, the video audio download reward option 905 is set to No, the extra reward option 907 is set to Yes, and the accompanying reward type selection 908 is set to an external page link reward type 911; because only one extra reward is designated to be offered, the reward minimum tip amount option 916 is forcibly set to No and becomes inactive.

In this case, the reward indicator (REWARDS) 800 and extra reward indicator 803 are displayed on the tipping button 400, and extra reward details (extra reward name and external page link) 809 are displayed in the reward details user interface 806.

In this case, when the viewer gives a tip by clicking on the tipping button 400, the extra reward provision button (extra reward name and external page link display) 1003 is displayed in the reward provision user interface 1000. The viewer can receive the reward by clicking on the extra reward provision button 1003.

Figure 16D:
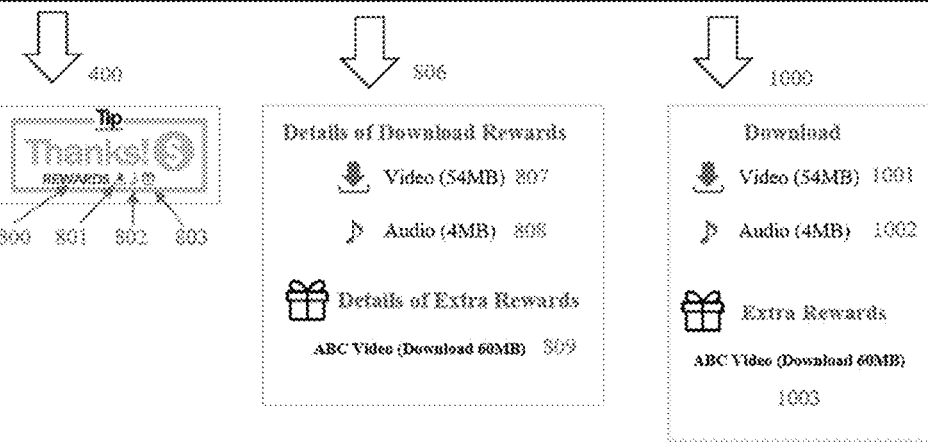
FIG. 16D is a schematic illustration of the relationship between the settings in a reward settings screen and the display of a tipping button.

In the example in FIG. 16D, the video download reward option 904, video audio download reward option 905, and extra reward option 907 are set to Yes; the accompanying reward type selection 908 is set to download reward type 909; three (a plurality of) rewards, a video download reward, a video audio download reward, and an extra reward, are offered; and the reward minimum tip amount option 916 is active, but set to No.

In this case, the reward indicator (REWARDS) 800, video download reward indicator 801, video audio download reward indicator 802, and extra reward indicator 803 are displayed on the tipping button 400, and video download reward details (file size indicator) 807, video audio download reward details (file size indicator) 808, and extra reward details (reward name and download, file size indication) 809 are displayed in the reward details user interface 806.

In this case, when the viewer gives a tip by clicking on the tipping button 400, the video download button (file size indication) 1001, video audio download button (file size indication) 1002, and extra reward provision button (reward name and download, file size indication) 1003 are displayed in the reward provision user interface 1000. The viewer can receive the rewards by clicking on the video download button 1001, video audio download button 1002, and extra reward provision button 1003.

Figure 16E:
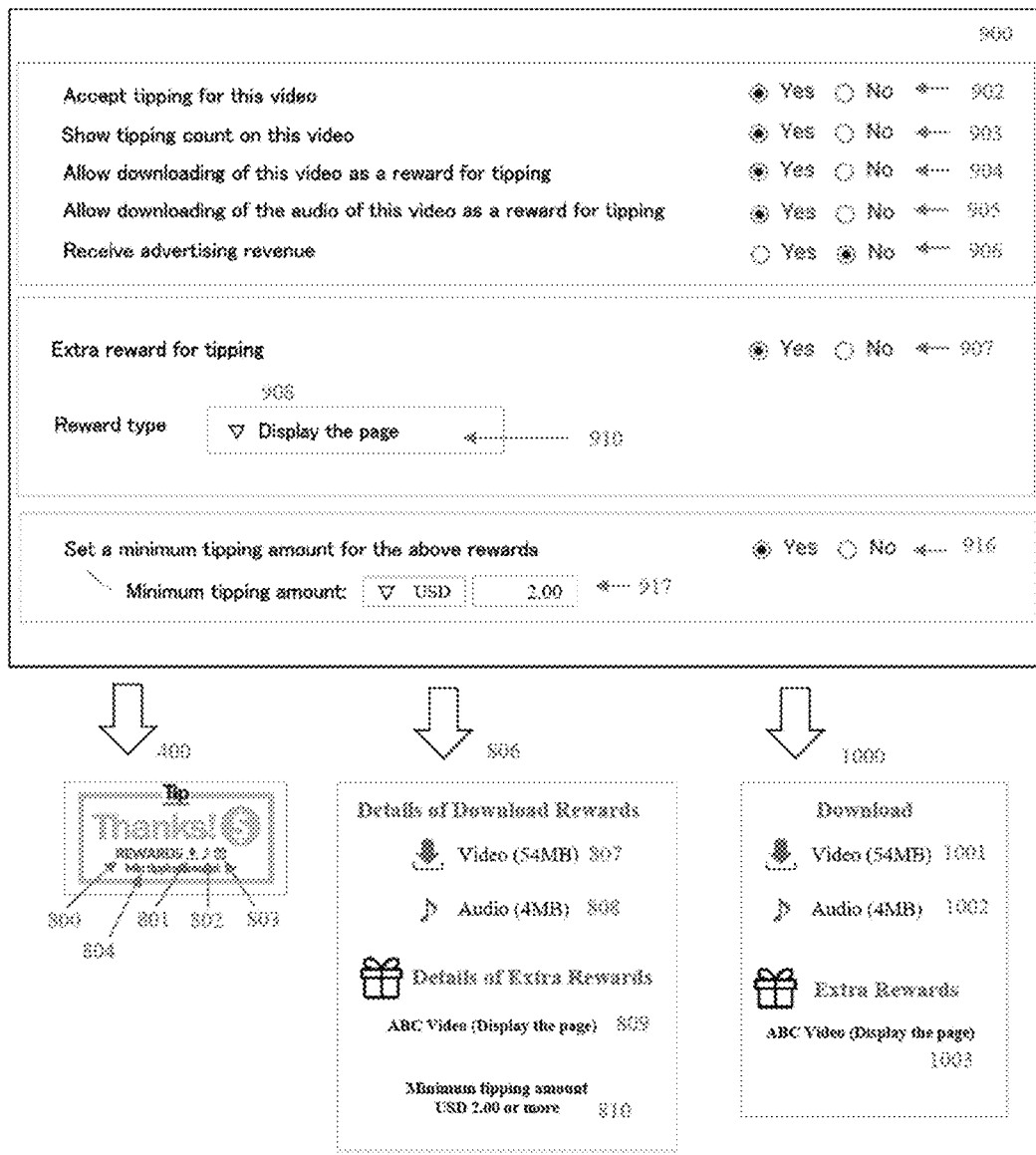
FIG. 16E is a schematic illustration of the relationship between the settings in a reward settings screen and the display of a tipping button.

In the example in FIG. 16E, the video download reward option 904, video audio download reward option 905, and extra reward option 907 are set to Yes; the accompanying reward type selection 908 is set to page display reward type 910; three (a plurality of) rewards, a video download reward, a video audio download reward, and an extra reward, are offered; the reward minimum tip amount option 916 is active and set to Yes; and an amount of "USD 2.00" is entered in the accompanying minimum tip currency selection/amount input box 917 and set.

In this case, the reward indicator (REWARDS) 800, video download reward indicator 801, video audio download reward indicator 802, extra reward indicator 803, and reward minimum tip amount indicator 804 are displayed on the tipping button 400, and video download reward details (file size indicator) 807, video audio download reward details (file size indicator) 808, extra reward details (extra reward name and page display type indication) 809, and reward minimum tip amount details (currency and USD 2.00 or more) 810 are displayed in the reward details user interface 806.

In this case, when the viewer gives a tip equal to or greater than the set reward minimum tip amount (in this example, USD 2.00 or more) by clicking on the tipping button 400, the video download button (file size indication) 1001, video audio download button (file size indication) 1002, and extra reward provision button (reward name and page display type indication) 1003 are displayed in the reward provision user interface 1000.

The viewer can receive the rewards by clicking on the video download button 1001, video audio download button 1002, and extra reward provision button 1003.

In this case, if the viewer gives a tip less than the set reward minimum tip amount (in this example, USD 2.00 or more) by clicking on the tipping button 400, the video download button 1001, video audio download button 1002, and extra reward provision button 1003 are not displayed in the reward provision user interface 1000, making it possible to receive the rewards.

Figure 16F:
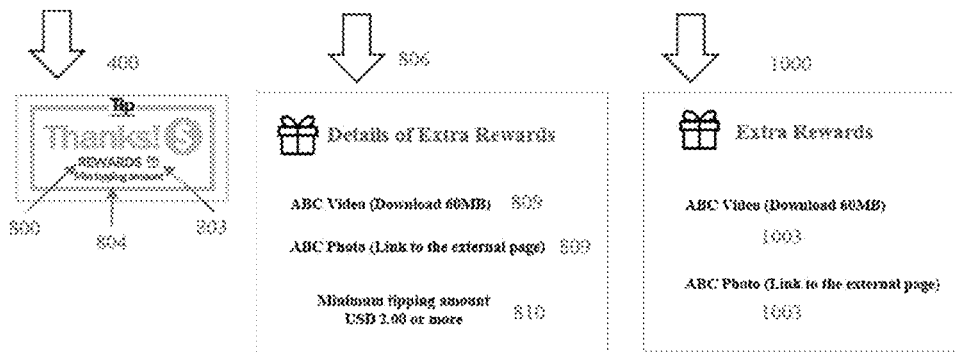
FIG. 16F is a schematic illustration of the relationship between the settings in a reward settings screen and the display of a tipping button.

In the example in FIG. 16F, the video download reward option 904 and video audio download reward option 905 are set to No, the extra reward option 907 is set to Yes, the accompanying reward type selection 908 is set to download reward type 909, the extra reward option 907 in the additional extra reward interface 920 is set to Yes, the accompanying reward type selection 908 is set to external page link reward type 911, and, because two (a plurality of) extra rewards are designated to be offered, the reward minimum tip amount option 916 is active and set to Yes, and an amount of "USD 2.00" is entered in the accompanying minimum tip currency selection/amount input box 917 and set.

In this case, the reward indicator (REWARDS) 800, extra reward indicator 803, and reward minimum tip amount indicator 804 are displayed on the tipping button 400; and extra reward details (extra reward name and download, file size indication) 809, extra reward details (extra reward name and external page link display) 809, and reward minimum tip amount details (currency and USD 2.00 or more) 810 are displayed in the reward details user interface 806. In this case, when the viewer gives a tip equal to or greater than the set reward minimum tip amount (in this case, USD 2.00 or more) by clicking on the tipping button 400, two extra reward provision buttons, an extra reward provision button (extra reward name and download, file size indication) 1003 and an extra reward provision button (extra reward name and external page link display) 1003, are displayed in the reward provision user interface 1000.

The viewer can receive the rewards by clicking on the extra reward provision buttons 1003.

In this case, if the viewer gives a tip less than the set reward minimum tip amount (in this case, USD 2.00 or more) by clicking on the tipping button 400, the extra reward provision button 1003 is not displayed, making it possible to receive the rewards.

19. Simultaneous Designation of Tip Remuneration Means and Ad Remuneration Means In the embodiment described in the previous sections, the reward provision options control module 125 activates either the tip acceptance option 902 or the ad income acceptance option 906, but not both, and activates either the accompanying tipping button/link display module 200 or the ad display module 124, but not both, thus forcing a mutually exclusive choice of tips or ads as the remuneration payment means.

However, it is also possible to change the settings of the reward provision options control module 125, simultaneously activate both the tip acceptance option 902 and the ad income acceptance option 906, and simultaneously activate the accompanying tipping button/link display module 200 and ad display module 124 to allow the tip acceptance option 902 and the ad income acceptance option 906 to be simultaneously set to Yes, and control the reward provision options control module 125 so as to simultaneously receive tip remuneration and ad remuneration.

In this case, the mutually exclusive operation of the tip acceptance option 902 and the ad revenue option 906, and the mutually exclusive operation of the accompanying tipping button/link display module 200 and ad display module 124, are eliminated.

As a result, the tip acceptance option 902 and ad income acceptance option 906 can be simultaneously set to Yes. In this case as well, however, the reward provision options control module 125 displays an active tip count display option 903, video download reward option 904, video audio download reward option 905, extra reward option 907, and reward minimum tip amount option 916, enabling selection and designation thereof, only when the tip acceptance option 902 has been set to Yes, as in the previous sections.

In this case as well, the tip count display option 903, video download reward option 904, video audio download reward option 905, extra reward option 907, and reward minimum tip amount option 916 are forcibly set to No and become inactive, making it impossible to select and designate these options, when the tip acceptance option 902 has been set to No, as in the previous sections.

20. Methods Other than Reward Details Tipping Button

Although the reward indicator (REWARDS) 800, video download reward indicator 801, video audio download reward indicator 802, extra reward indicator 803, and reward minimum tip amount indicator 804 are displayed within the tipping button 400 in the examples described in the previous sections, the present invention is not limited to such an embodiment; any embodiment that utilizes a display method whereby a viewer can confirm the presence of rewards and the reward minimum tip amount setting when giving tips, and that is in keeping with the gist of the present invention as described in section 17, "Tipping button details display function", is acceptable.

Figure 17:
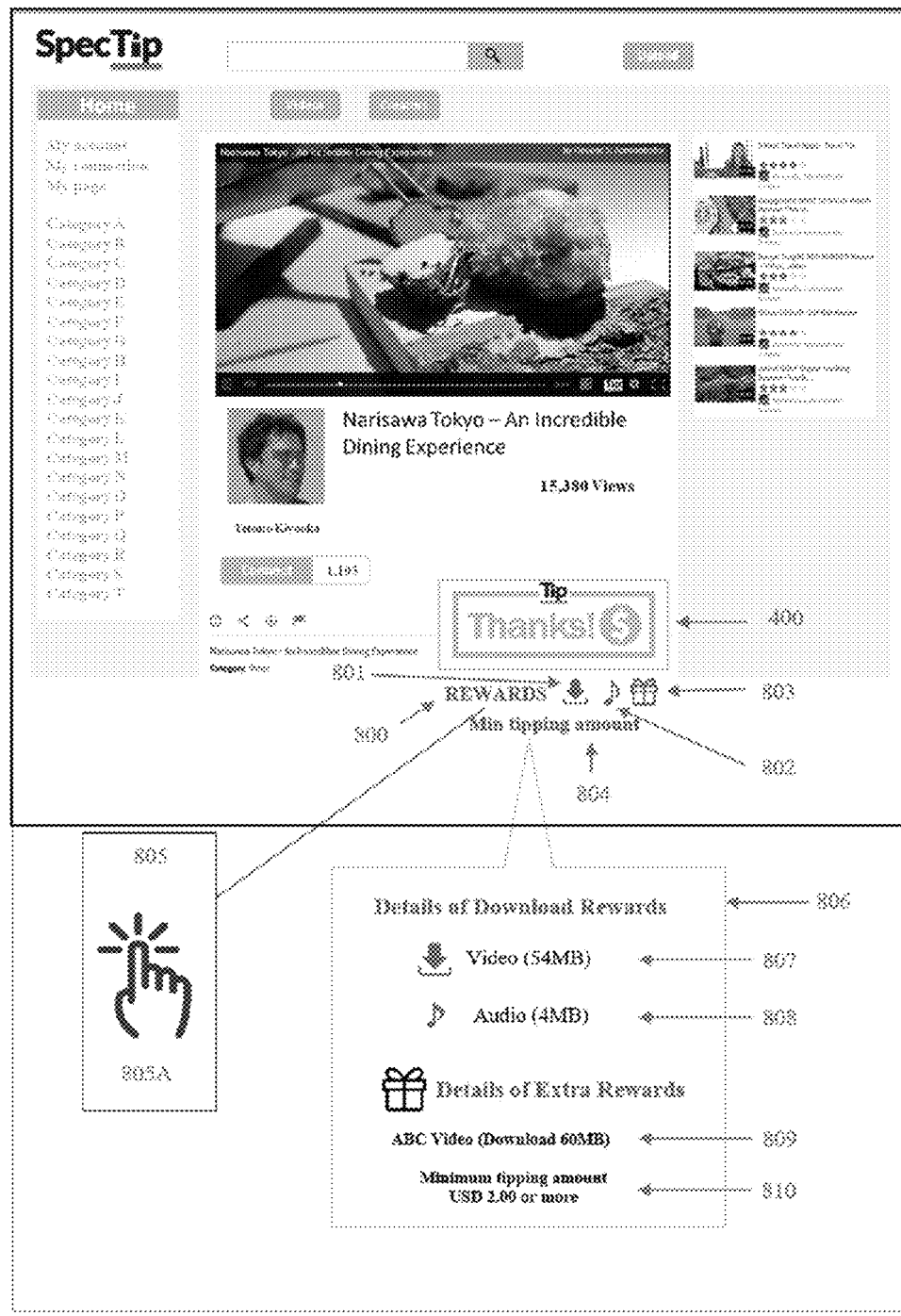
FIG. 17 is a schematic illustration of a video playback interface.
Figure 18:
FIG. 18 is a schematic illustration of a tip receipt statement.
Figure 19:
FIG. 19 is a schematic illustration of a tip payment statement.

For example, the reward indicator (REWARDS) 800, video download reward indicator 801, video audio download reward indicator 802, extra reward indicator 803, and reward minimum tip amount indication 804 can be displayed below the tipping button 400, as seen in FIG. 17, to allow the viewer to give tips using the tipping button 400, and to confirm and recognize the presence of rewards in exchange for tips and the reward minimum tip amount setting.

In this case as well, as in section 17, "Tipping button details display function", when the viewer hovers (without clicking) the mouse pointer 805 over any of the reward indicator (REWARDS) 800, video download reward indicator 801, video audio download reward indicator 802, extra reward indicator 803, and reward minimum tip amount indicator 804 displayed on the tipping button 400, the reward details interface 806 is displayed; and the video download reward details 807, video audio download reward details 808, extra rewards details 809, and reward minimum tip amount details 810 are displayed, allowing the viewer to confirm the details before tipping. Similarly, in the case of a touchscreen-type browser 170 as well, any of the reward indicator (REWARDS) 800, video download reward indicator 801, video audio download reward indicator 802, extra reward indicator 803, and reward minimum tip amount indicator 804 can be touched 805A to display the reward details interface 806, allowing the details thereof to be confirmed.

21. Operator Default Settings

The operator of the video hosting website 100 can preset default settings for the user interface 600, in which the tipping button 400 is set, and the user interface 900, in which rewards for tips are set.

For example, it is generally unrealistic to assume that a tip of less than USD 1.00 will be given in the United States, where tipping is and established custom—in other words, the act of giving a tip less than USD 1.00 may be equivalent to an insult.

Therefore, the operator of the video hosting website 100 can preset a default tip amount setting of "USD 1.00" per click of the tipping button 400 in the user interface 600 in which the tipping button 400 is set.

The viewer can also check and alter the settings for the tipping button 400 at any time by logging into the user account page (not shown) and using the tipping settings button (not shown) to access the user interface 600 and confirm and alter the default settings for the tipping button 400.

Similarly, the operator of the video hosting website 100 can set default settings for the user interface 900, in which rewards for tips are set.

The reason for this is that it is possible, in view of the characteristics of the present invention, for tip revenue to be the main revenue stream of the content provider, and a plurality of rewards (premiums) out of a video download reward, a video audio download reward, and an extra reward can be offered so that the viewer can clearly understand that these services are rewards (premiums) for tips given when viewing videos, while simultaneously increasing, through the plurality of rewards (premiums), the viewer's incentive to tip, which also leads to increased tip revenue for the content provider.

Thus, the operator of the website can also, for example, set the tip acceptance option 902, video download reward option 904, and video audio download reward option 905 to Yes as default settings. As discussed above, the content provider can also click the video "Upload" button 401 to access the user interface 900 and confirm and change the default reward settings.

22. Tip Revenue Sharing Methods and Tip Statements

After a viewer has given a tip, the tip revenue module 206 calculates and generates tip revenue shares as agreed upon by the content provider and the video hosting website 100, and the user database 131 of the content provider, and the associated video database 130, are updated and saved.

For example, revenue shares of 60% for the content provider and 40% for the operator of the video hosting website 100 are agreed upon, and, when a viewer gives a tip of $1.00, the content provider receives $0.60 and the operator of the video hosting website 100 receives $0.40. Once a tip payment is confirmed, the tip revenue module 205 distributes the tip revenue according to conditions (revenue shares, payment conditions, bank account for depositing tips, etc.) agreed upon with the content provider 140.

The tip revenue module 206 receives and displays information on tip revenue details (numbers of transactions, times/dates, currencies, amounts, revenue shares, revenue amounts, tip payment dates, tip givers) for all videos uploaded by a content provider to the tipping receipt user interfaces 1800, 1801, and the details (numbers of transactions, times/dates, currencies, amounts, payment IDs) for tips given by viewers for various videos on the user interfaces 1900, 1901, from the video database 130 and the user database 131.

While the foregoing, in order to make the invention clearer, includes explicit disclosures of services only for content providers and viewers, services can be offered to all users possessing a user ID 160.

While the video hosting website 100 in the present invention is a video sharing site, some of the functions (tipping and rewards) of the present invention can also be applied to other online services such as image sharing sites, SNSs, and blogs.

The present invention is not limited to the embodiment described above, and various modifications may be made thereto to the extent that they do not depart from the gist of the invention.

DESCRIPTION OF THE REFERENCE NUMBERS

100: Video hosting website
110: Front end server
120: Video provision module
1212: Video importing module
122: Video analysis module
123: Tipping module
124: Ad display module
125: Reward provision options control module
130: Video database
131: User database
132: Video audio database
133: Video analysis database
134: flagged-for-review video database
135: Extra rewards database
136: Reward minimum tip amount database
140: Content provider terminal
141: Viewer terminal
150: Network
160: User ID
170: Browser
202: Tipping button/link display module
201: Tip processing module
202: Video download button/link display module
203: Video audio module
204: Extra reward module
205: Reward minimum tip amount module
206: Tip revenue module
400: Tipping button
800: Reward indicator
801: Video download reward indicator
802: Video audio download reward indicator
803: Extra reward indicator
804: Reward minimum tip amount indicator
806: Reward details interface
807: Video download reward details
808: Video audio download reward details
809: Extra reward details 810: Reward minimum tip amount details
900: User interface
901: User interface
909: Download reward type
910: In-site page display reward type
911: External page link reward type
912: User interface
913: URL input box
914: Reward name
915: Reward description
916: Option
917: Minimum tip currency selection/amount input box
918: Button
919: Add extra reward button
920: Additional extra reward interface
1000: Reward provision user interface
1001: Video download button
1002: Video audio download button
1003: Extra reward provision button
1500: User interface
1800, 1801: Tip receipt user interface
1900, 1901: User interface

The invention claimed is:

1. A video streaming playback system comprising:
   a video playback module configured to display a video, uploaded to a specific video hosting site by a user who is a content provider, on a user interface displayed on a computer of a user who is a content consumer so as to enable streaming playback of the video over the Internet;
   a tipping module configured to run in accordance with a streaming playback operation of the video playback module without obstructing said streaming playback operation;
   a reward download button/link display module configured to work in tandem with a tipping process performed by the tipping module; and
   a settings module configured to provide a settings interface that enables the user who is a content provider to set one or more different rewards in response to the tip, and to set a minimum tip amount only when a specific number of two or more rewards is offered;
   wherein the tipping module comprises:
   a tipping button/link display module configured to display an active tipping button/link on the user interface; and
   a payment processing module configured, in response to an operation of the displayed active tipping button/link by the content consumer, to process payment of a tip of a specific amount according to a default amount or an amount set by the user who is a content provider;
   wherein the payment processing module:
   only when the user who is a content provider has set in the settings interface whereby a specific number of two or more rewards is offered, verifies whether an amount set by the content consumer, or the default amount, is equal to or greater than the set minimum tip amount when processing payment of the tip, and otherwise processes payment according to the amount entered by the content consumer or the default amount without verifying the minimum tip amount; and
   wherein the reward download button/link display module:
   displays an active reward download button/link on the user interface in response to a tipping process being executed for the video to enable the one or more different rewards to be downloaded to and displayed on a computer of the content consumer, when the user who is a content provider has set to offer the one or more different rewards for tips; and
   does not display the active specific reward download button/link when the user who is the user who is a content provider has set not to offer the one or more different rewards for tips.

2. The system according to claim 1, wherein:
   the reward download button/link display module displays an indicator corresponding to a downloadable reward as a reward download button/link.

3. The system according to claim 1, wherein:
   the reward download button/link display module displays in the user interface detailed information on the one or more different rewards set by the user who is a content provider when a reward download button/link is moused over.

4. The system according to claim 3, wherein:
   the minimum tip amount set by the user who is a content provider is displayed in the detailed information on the rewards.

5. The system according to claim 1, further comprising:
   in addition to the tipping module, an ad display module configured to display a specific ad on the user interface before and/or during playback of the video in tandem with a video playback operation performed by the video playback module; and
   wherein the system determines either to launch the tipping module or to launch the ad display module according to default or a setting selected by the user who is a content provider.

6. The system according to claim 5, wherein:
   the system determines either to launch the tipping module or to launch the ad display module.

7. The system according to claim 1, wherein:
   the rewards include at least downloading the uploaded video file.

8. The system according to claim 1, wherein:
   the rewards include at least downloading an audio file of a video.

9. The system according to claim 1, further configured so that:
   the user who is a content provider can upload content other than the video as a reward.

10. The system according to claim 1, wherein:
    only a single amount can be set for the minimum tip amount, even when the specific number of two or more rewards is set.

* * * * *